(12) United States Patent
Sato et al.

(10) Patent No.: US 9,292,733 B2
(45) Date of Patent: Mar. 22, 2016

(54) INFORMATION PROCESSING DEVICE, INFORMATION PROCESSING METHOD, AND PROGRAM

(75) Inventors: Yoichiro Sato, Tokyo (JP); Kaname Ogawa, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 813 days.

(21) Appl. No.: 13/413,986

(22) Filed: Mar. 7, 2012

(65) Prior Publication Data

US 2012/0243742 A1 Sep. 27, 2012

(30) Foreign Application Priority Data

Mar. 22, 2011 (JP) ................................. 2011-062736

(51) Int. Cl.
*G06K 9/00* (2006.01)
(52) U.S. Cl.
CPC ........ *G06K 9/00281* (2013.01); *G06K 9/00288* (2013.01)
(58) Field of Classification Search
None
See application file for complete search history.

(56) References Cited

U.S. PATENT DOCUMENTS

| | | | | |
|---|---|---|---|---|
| 2009/0220155 A1* | 9/2009 | Yamamoto et al. | ........... | 382/190 |
| 2010/0104217 A1* | 4/2010 | Tsurumi | ........ | 382/284 |
| 2011/0131158 A1* | 6/2011 | Furukawa et al. | .......... | 706/12 |
| 2011/0135192 A1* | 6/2011 | Yokono | .......... | 382/160 |

FOREIGN PATENT DOCUMENTS

| | | | | | |
|---|---|---|---|---|---|
| JP | 2004246618 A | * | 9/2004 | ............... | G06T 7/00 |
| JP | 2006-4003 | | 1/2006 | | |

* cited by examiner

*Primary Examiner* — Weiwen Yang
(74) *Attorney, Agent, or Firm* — Hazuki International, LLC

(57) ABSTRACT

An information processing device includes a conversion unit that performs conversion such that an area including a feature point and the periphery thereof in a specific target is set as a first area and, when one pixel in the first area is set as a reference pixel, an area including the reference pixel and pixels in the periphery thereof is set as a second area, and, based on a comparison result of the feature amount of the reference pixel and the feature amount of another pixel in the second area, the feature amount of another pixel is converted for each pixel in the second area, and a calculation unit that calculates a feature amount to be used in an identification process for identifying the specific target by performing computation for the value of each pixel in the second area which is obtained from the conversion for each reference pixel.

14 Claims, 25 Drawing Sheets

⇩ FACE DETECTION PROCESS

EYE DETECTION PROCESS

⇩ FACE IMAGE GENERATION

FIG. 6
| FEATURE POINT IDENTIFICATION INFORMATION | FEATURE POINT DETECTION DICTIONARY |
|---|---|
| 0 | 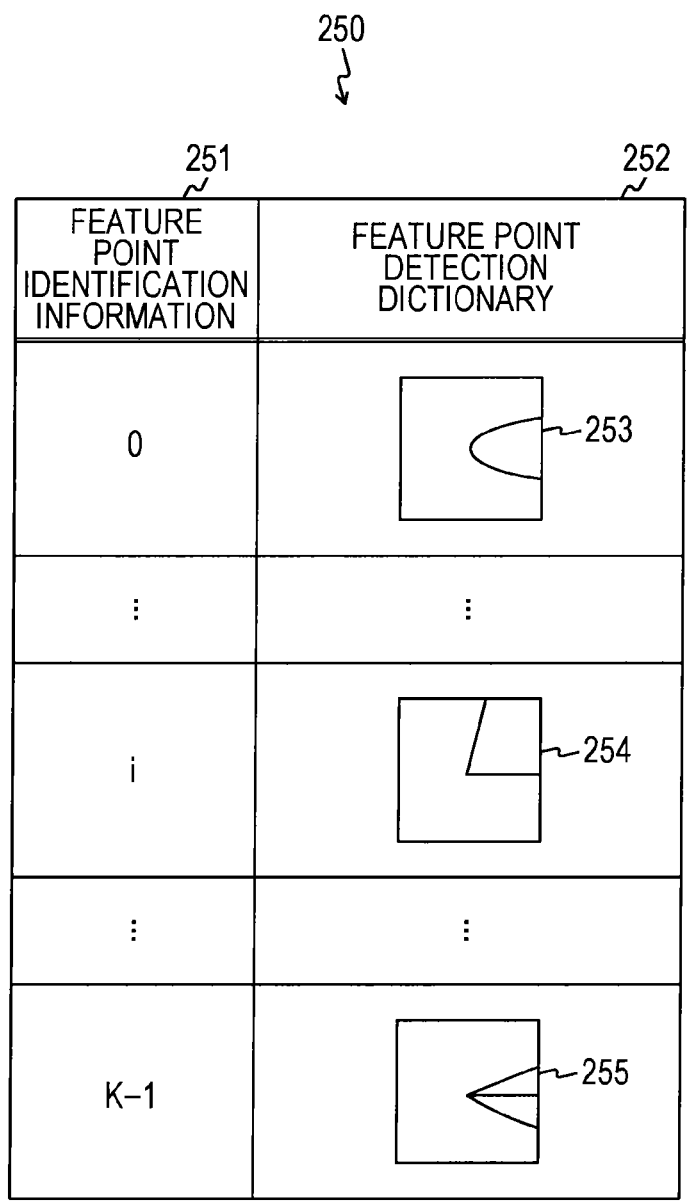 ~253 |
| ⋮ | ⋮ |
| i |  ~254 |
| ⋮ | ⋮ |
| K−1 | 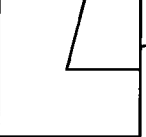 ~255 |

FIG. 9

| INDIVIDUAL IDENTIFICATION INFORMATION | NAME | REGISTERED FACE INFORMATION | FEATURE AMOUNT |
|---|---|---|---|
| #100 | SANRO KODA | ... | ... |
| #101 | ZIRO OTSUKAWA | ... | ... |
| #102 | YOSHIKO HEITANI | ... | ... |
| ⋮ | ⋮ | ⋮ | ⋮ |

| | FEATURE POINT IDENTIFICATION INFORMATION | POSITIONAL INFORMATION (x, y) | | THRESHOLD VALUE (th) | SCORE ($\alpha$) |
|---|---|---|---|---|---|
| | | x | y | | |
| 0 | $k_0$ | $x_0$ | $y_0$ | $th_0$ | $\alpha_0$ |
| 1 | $k_1$ | $x_1$ | $y_1$ | $th_1$ | $\alpha_1$ |
| ⋮ | ⋮ | ⋮ | ⋮ | ⋮ | ⋮ |
| L−1 | $k_{L-1}$ | $x_{L-1}$ | $y_{L-1}$ | $th_{L-1}$ | $\alpha_{L-1}$ |

| (0, 0) | (1, 0) | (2, 0) | (3, 0) | (4, 0) |
|---|---|---|---|---|
| (0, 1) | (1, 1) | (2, 1) | (3, 1) | (4, 1) |
| (0, 2) | (1, 2) | (2, 2) | (3, 2) | (4, 2) |
| (0, 3) | (1, 3) | (2, 3) | (3, 3) | (4, 3) |
| (0, 4) | (1, 4) | (2, 4) | (3, 4) | (4, 4) |

FIG. 13A

| 10 | 11 | 12 | 13 | 14 | 15 | 16 |
|----|----|----|----|----|----|----|
| 17 | 18 | 19 | 20 | 21 | 22 | 23 |
| 24 | 25 | 1  | 2  | 3  | 26 | 27 |
| 28 | 29 | 4  | 5  | 6  | 30 | 31 |
| 32 | 33 | 7  | 8  | 9  | 34 | 35 |
| 36 | 37 | 38 | 39 | 40 | 41 | 42 |
| 43 | 44 | 45 | 46 | 47 | 48 | 49 |

FIG. 13B

| 10 | 11 | 12 | 13 | 14 |
|----|----|----|----|----|
| 17 | 18 | 19 | 20 | 21 |
| 24 | 25 | 1  | 2  | 3  |
| 28 | 29 | 4  | 5  | 6  |
| 32 | 33 | 7  | 8  | 9  |

FIG. 13C

| +1 | +1 | +1 | +1 | −1 |
|----|----|----|----|----|
| +1 | +1 | +1 | −1 | −1 |
| +1 | +1 |    | −1 | −1 |
| −1 | −1 | −1 | −1 | −1 |
| +1 | +1 | +1 | +1 | −1 |

| +1 | +1 | +1 | +1 | −1 |
|---|---|---|---|---|
| +1 | +1 | +1 | −1 | −1 |
| +1 | +1 |  | −1 | −1 |
| +1 | −1 | −1 | −1 | −1 |
| +1 | +1 | +1 | +1 | −1 |

525

542

| +1 | +1 | +1 | −1 | −1 |
|---|---|---|---|---|
| +1 | +1 | −1 | −1 | −1 |
| +1 | −1 |  | −1 | −1 |
| −1 | −1 | −1 | −1 | −1 |
| +1 | +1 | +1 | −1 | −1 |

532

543

⋮

| −1 | −1 | −1 | −1 | −1 |
|---|---|---|---|---|
| −1 | −1 | −1 | −1 | −1 |
| +1 | +1 |  | −1 | −1 |
| +1 | +1 | +1 | −1 | +1 |
| +1 | −1 | −1 | +1 | +1 |

| +7 | +3 | −3 | −7 | −9 |
|---|---|---|---|---|
| +3 | −3 | −7 | −9 | −9 |
| +3 | −1 |  | −7 | −9 |
| +5 | +3 | +1 | −3 | −5 |
| +9 | +7 | +3 | −1 | −1 |

541

| 540 | +7 | +3 | -3 | -7 | -9 |
|---|---|---|---|---|---|
| | +3 | -3 | -7 | -9 | -9 |
| | +3 | -1 |  | -7 | -9 |
| | +5 | +3 | +1 | -3 | -5 |
| | +9 | +7 | +3 | -1 | -1 |

| 545 | +4 | -3 | +3 | -6 | -9 |
|---|---|---|---|---|---|
| | +2 | +1 | -7 | -7 | -8 |
| | +3 | -1 |  | -5 | -9 |
| | +7 | +1 | +3 | +1 | -4 |
| | +8 | +3 | +7 | -2 | -1 |

⋮

| 546 | +3 | -3 | -9 | +3 | -7 |
|---|---|---|---|---|---|
| | +7 | -3 | +4 | -8 | -3 |
| | +2 | -1 |  | -7 | +3 |
| | +6 | +7 | +6 | -6 | -5 |
| | +5 | +3 | +3 | -1 | -2 |

0TH ROW   FEATURE POINT IDENTIFICATION INFORMATION: #9   POSITIONAL INFORMATION (x, y): (1, 3)

1ST ROW   FEATURE POINT IDENTIFICATION INFORMATION: #15   POSITIONAL INFORMATION (x, y): (3, 2)

(L-1)TH ROW   FEATURE POINT IDENTIFICATION INFORMATION: #42   POSITIONAL INFORMATION (x, y): (3, 4)

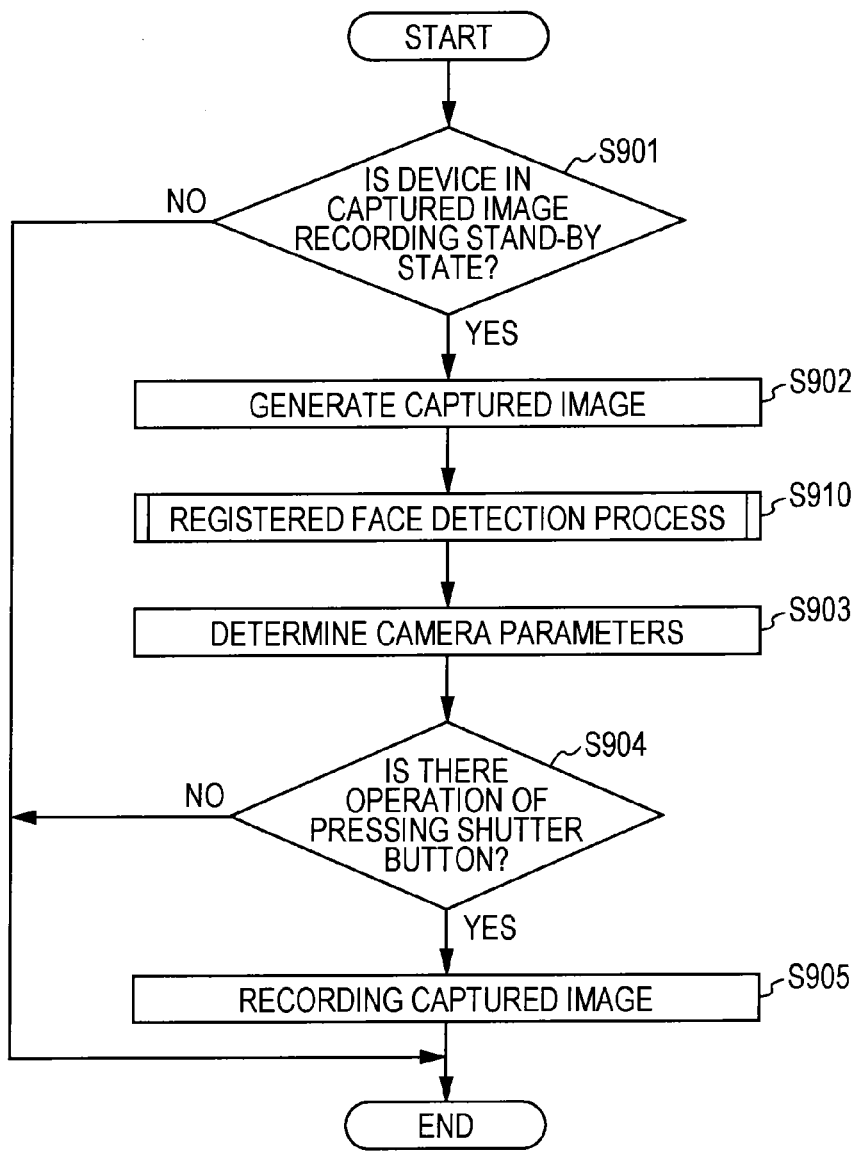

INFORMATION PROCESSING DEVICE, INFORMATION PROCESSING METHOD, AND PROGRAM

BACKGROUND

The present disclosure relates to an information processing device. Specifically, the disclosure relates to an information processing device that treats images, an information processing method, and a program that causes a computer to execute the method.

In the related art, there has been proposed a subject recognition technique for recognizing what the subject included in an image generated by an information processing device such as a digital still camera, a digital video camera (for example, a camera-integrated recorder), or the like is. As the subject recognition technique, for example, a face detection technique has been proposed which detects the face of a person included in an image through image processing using feature amounts such as luminance, color, and the like.

In addition, there has been proposed a technique for identifying whether a face detected using the face detection technique as above is the face of a specific person.

For example, an image processing device has been proposed in which local feature amounts among a plurality of feature points disposed in a fixed interval on a face included in an image are detected by a Gabor filter, and the face of a person is identified using the detected feature amounts (refer to, for example, Japanese Unexamined Patent Application Publication No. 2006-4003). In the image processing device, feature points separately positioned in a fixed interval on the face included in the image are detected, and the local feature amounts of the feature points are detected by the Gabor filter. Then, by computing the extent of similarity between the detected feature amounts and the feature amount of a face that has been registered in advance, the face of the person is identified.

SUMMARY

According to the related art described above, the local feature amounts of the feature points disposed in a fixed interval on the face included in the input image are obtained, and then a specific target (for example, the face of a person) can be identified using the feature amounts.

In the related art described above, however, since the feature amounts are obtained using the Gabor filter, the computation amount increases. Herein, in an imaging device such as a digital still camera, a digital video camera, or the like, for example, when a face is identified in a generated image, it is important to maintain the accuracy in identifying the face and to swiftly perform a face identification process. As such, in each case, it is important to maintain accuracy in the process of identifying a specific target and to swiftly perform the identification process.

It is therefore desirable to swiftly perform a process of identifying a specific target.

According to an embodiment of the present disclosure, there are provided an information processing device including a conversion unit that performs conversion such that an area including a feature point and the periphery thereof in a specific target included in an image is set as a first area and, when one pixel included in the first area is set as a reference pixel, an area including the reference pixel and pixels in the periphery thereof is set as a second area, and, based on a comparison result of the feature amount of the reference pixel and the feature amount of another pixel included in the second area relating to the reference pixel, the feature amount of another pixel is converted for each pixel included in the second area, and a calculation unit that calculates a feature amount to be used in an identification process for identifying the specific target by performing computation for the value of each pixel included in the second area which is obtained from the conversion for each reference pixel for the position of each pixel included in the second area, an information processing method, and a program that causes a computer to execute the method. Accordingly, an effect is exhibited such that, based on a comparison result of the feature amount of the reference pixel and the feature amount of another pixel included in the second area relating to the reference pixel, the feature amount of another pixel is converted for each pixel, and a feature amount is calculated, which is to be used in an identification process for identifying the specific target by performing computation for the value of each pixel included in the second area which is obtained for each reference pixel for the position of each pixel included in the second area.

In addition, according to the embodiment of the present disclosure, the calculation unit may calculate, as a feature amount to be used in the identification process, a feature amount having the computation result for each position of each pixel included in the second area as a constituent element. Accordingly, an effect is exhibited such that a feature amount having the computation result for each position of each pixel included in the second area as a constituent element.

In addition, according to the embodiment of the present disclosure, an identification unit may be further included, which performs the identification process by comparing a corresponding feature amount acquired from a storage unit that stores the feature amount to be used in the identification process in relation to the specific target to the calculated feature amount. Accordingly, an effect is exhibited such that the identification process is performed by comparing the feature amount acquired from the storage unit to the calculated feature amount for each constituent element.

In addition, according to the embodiment of the present disclosure, the conversion unit may perform the conversion for a plurality of feature points in the specific target, the calculation unit calculates the feature amounts to be used in the identification process for the plurality of feature points, and the identification unit performs the identification process by comparing the feature amount acquired from the storage unit to the calculated feature amount for each of the feature points. Accordingly, an effect is exhibited such that conversion for a plurality of feature points in the specific target is performed, the feature amounts for the plurality of feature points are calculated, and the identification process is performed by comparing the feature amount acquired from the storage unit to the calculated feature amount for each feature point.

In addition, according to the embodiment of the present disclosure, when the feature amount of another pixel included in the second area relating to the reference pixel is great based on the feature amount of the reference pixel, the feature amount may be converted to a first value, and when the feature amount of another pixel included in the second area relating to the reference pixel is small based on the feature amount of the reference pixel, the feature amount may be converted to a second value. Accordingly, an effect is exhibited such that, when the feature amount of another pixel included in the second area relating to the reference pixel is great based on the feature amount of the reference pixel, the feature amount is converted to the first value, and when the feature amount of another pixel included in the second area relating to the reference pixel is small based on the feature amount of the reference pixel, the feature amount is converted to the second value.

In addition, according to the embodiment of the present disclosure, the conversion unit may perform the conversion by setting any one of the first and the second values to a positive value and the other to a negative value. Accordingly, an effect is exhibited such that any one of the first and the second values is set to a positive value, and the other one is set to a negative value.

In addition, according to the embodiment of the present disclosure, the calculation unit may calculate the feature amount to be used in the identification process by performing addition as the computation. Accordingly, an effect is exhibited such that the feature amount is calculated by performing addition of the same element.

In addition, according to the embodiment of the present disclosure, the conversion unit may perform the conversion by changing at least one of the size and the shape of the first area relating to the plurality of feature points in the specific target in accordance with the feature points. Accordingly, an effect is exhibited such that conversion is performed by changing at least one of the size and the shape of the first area relating to the plurality of feature points in the specific target in accordance with the feature points.

In addition, according to the embodiment of the present disclosure, the conversion unit may perform the conversion by changing at least one of the size and the shape of the second area relating to the plurality of feature points in the specific target in accordance with the feature points. Accordingly, an effect is exhibited such that conversion is performed by changing at least one of the size and the shape of the second area relating to the plurality of feature points in the specific target in accordance with the feature points.

In addition, according to the embodiment of the present disclosure, the conversion unit may perform the conversion only for a position relating to the feature amount to be used in the identification process among the positions of pixels included in the second area, and the identification unit may perform the computation only for a position relating to the feature amount to be used in the identification process among the positions of pixels included in the second area. Accordingly, an effect is exhibited such that conversion is performed only for the position relating to the feature amount used in the identification process and computation is performed only for the position relating to the feature amount used in the identification process.

In addition, according to the embodiment of the present disclosure, a specific target detection unit that detects the specific target included in the image, a feature point detection unit that detects the feature points in the detected specific target, and an identification unit that performs the identification process using a corresponding feature amount acquired from a storage unit that stores the feature amount to be used in the identification process in relation to the specific target and the calculated feature amount may be further included. Accordingly, an effect is exhibited such that the specific target included in the image is detected, the feature point of the detected specific target is detected, and the identification process is performed using the feature amount acquired from the storage unit and the calculated feature amount.

In addition, according to the embodiment of the present disclosure, the specific target may be the face of a person, the feature point may be at least one edge portion of organs included in the face, and the identification process may identify whether or not the detected face of the person is the face of a specific person. Accordingly, an effect is exhibited such that identification is performed to identify whether or not the face of the detected person is the face of a specific person.

According to the embodiment of the present disclosure, an excellent effect of performing a rapid process of identifying a specific target can be exhibited.

BRIEF DESCRIPTION OF THE DRAWINGS

FIG. 6 is a diagram schematically showing an example of stored content of a feature point detection dictionary storage unit according to the first embodiment of the present disclosure;

FIG. 9 is a diagram schematically showing an example of stored content of a registered face feature amount storage unit according to the first embodiment of the present disclosure;

FIGS. 13A to 13C are diagrams schematically showing pixels used for the feature amount calculation by the feature amount calculation unit according to the first embodiment of the present disclosure;

FIGS. 15A and 15B are diagrams schematically showing the relationship between each piece of encoded information calculated by the feature amount calculation unit and feature amounts calculated in an addition process of the encoded information according to the first embodiment of the present disclosure;

FIG. 18 is a flowchart showing an example of a processing procedure of an image recording process by the imaging device according to the first embodiment of the present disclosure;

DETAILED DESCRIPTION OF EMBODIMENTS

Hereinafter, exemplary embodiments of the present disclosure (hereinafter, referred to as embodiments) will be described. Description will be provided in the following order.

1. First Embodiment (Feature amount calculation control: An example of calculating feature amounts relating to feature points in a specific target as feature amounts used in an identification process of the specific target)

2. Second Embodiment (Feature amount calculation control: An example of changing the size of a feature point peripheral area used when feature amounts are calculated, in accordance with the feature point)

1. First Embodiment

Configuration Example of Imaging Device

Figure 1:
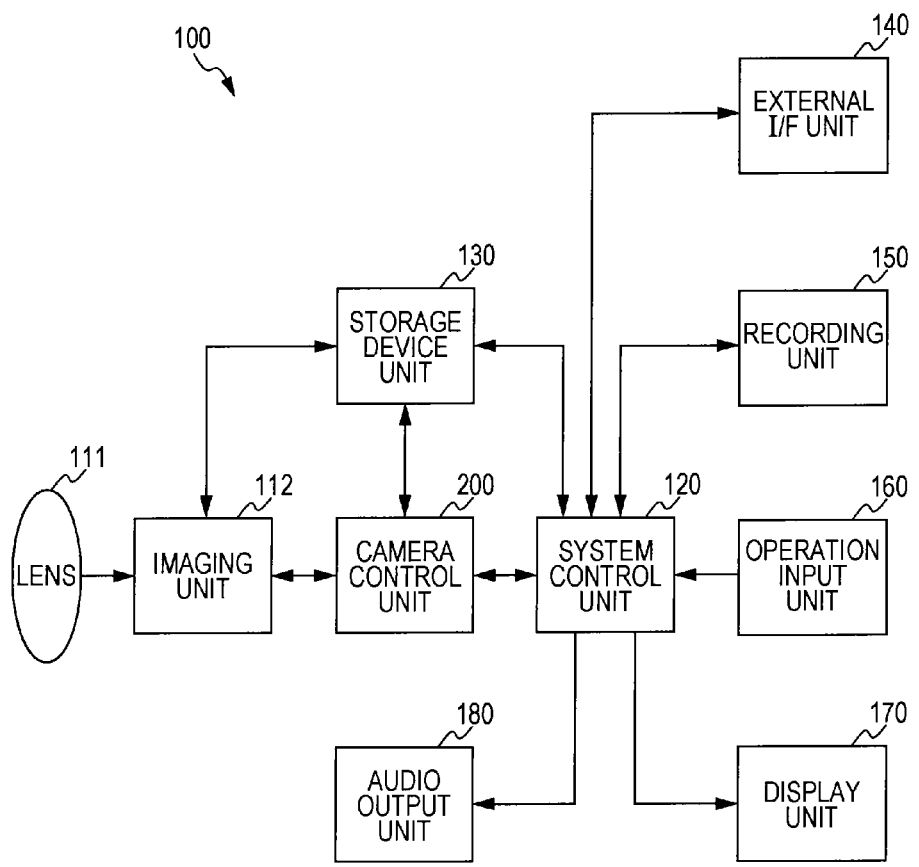
FIG. 1 is a block diagram showing a functional configuration example of an imaging device according to a first embodiment of the present disclosure.

FIG. 1 is a block diagram showing a functional configuration example of an imaging device 100 according to a first embodiment of the present disclosure.

The imaging device 100 includes lenses 111, an imaging unit 112, a system control unit 120, a storage device unit 130, an external I/F (interface) unit 140, a recording unit 150, an operation input unit 160, a display unit 170, an audio output unit 180, and a camera control unit 200. The imaging device 100 generates image data by, for example, imaging subjects, and extracts each feature amount by performing image analysis for the image data, and can be realized as a digital still camera that can perform various kinds of image processing using such each extracted feature amount. Furthermore, the imaging device 100 is an example of an information processing device described in the claims.

The lenses 111 are constituted by a plurality of lenses (a zoom lens, a focus lens, and the like) that concentrates light from a subject, and light incident from the subject is supplied to the imaging unit 112 via the lenses.

The imaging unit 112 includes an imaging element (not shown in the drawing) having an electric shutter function, and a signal processing unit (not shown in the drawing) that generates images (image data) by processing output signals of the imaging element. In other words, the imaging unit 112 generates an image (captured image) in such a way that an optical image of a subject incident via the lenses 111 forms an image on the imaging face of the imaging element, the imaging element performs an imaging operation in that state, and the signal processing unit performs signal processing for imaging signals. Then, the generated image is supplied to and stored in the storage device unit 130. Furthermore, camera parameters (imaging parameters) used in the generation of the image are sequentially determined by the camera control unit 200.

The camera control unit 200 controls the imaging unit 112 based on the image supplied from the imaging unit 12 via the storage device unit 130 and the control by the system control unit 120. The camera control unit 200 will be described in detail with reference to FIG. 2.

The system control unit 120 controls the overall imaging device 100. For example, the system control unit 120 performs control according to operation inputs that the operation input unit 160 receives from a user. In addition, the system control unit 120 controls display of a menu screen or the like displayed on the display unit 170, recording and reading of images for the recording unit 150, and communication with an external computer or a network performed through the external I/F unit 140, and the like. Furthermore, the system control unit 120 controls the display unit 170 to display the image generated by the imaging unit 112 when the system control unit monitors the imaging operation.

The storage device unit 130 is a main storage device for temporarily saving images, and the like on the system of the imaging device 100, and constituted by, for example, a DRAM (Dynamic Random Access Memory). In other words, exchanges of images between each unit in the imaging device 100 are performed mostly through the storage device unit 130.

The external I/F unit 140 is an external interface including input and output terminals such as a USB (Universal Serial Bus), or the like, and provides an interface for connection to an external computer or to a network.

The recording unit 150 records the image generated by the imaging unit 112 based on the control of the system control unit 120. In addition, the recording unit 150 supplies recorded images to the system control unit 120 based on the control of the system control unit 120. As the recording unit 150, for example, a recording medium such as a flash memory, or the like can be used. In addition, the recording unit 150 may be installed in the imaging device 100, or may be detachably mounted on the imaging device 100.

The operation input unit 160 is an operation input unit that receives operation inputs from a user, and outputs signals to the system control unit 120 according to the received operation inputs. For example, if a shutter button is pressed down in order to instruct to record an image, a signal corresponding to the pressing-down of the shutter button is output to the system control unit 120.

The display unit 170 is a display unit for displaying various images based on the control of the system control unit 120. The display unit 170 displays, for example, the image generated by the imaging unit 112 (for example, a through image), an image read from the recording unit 150, a menu screen to be provided to the user, and the like.

The audio output unit 180 outputs various kinds of audio information based on the control of the system control unit 120. The audio output unit 180 can be realized by, for example, a speaker.

[Configuration Example of Camera Control Unit]

Figure 2:
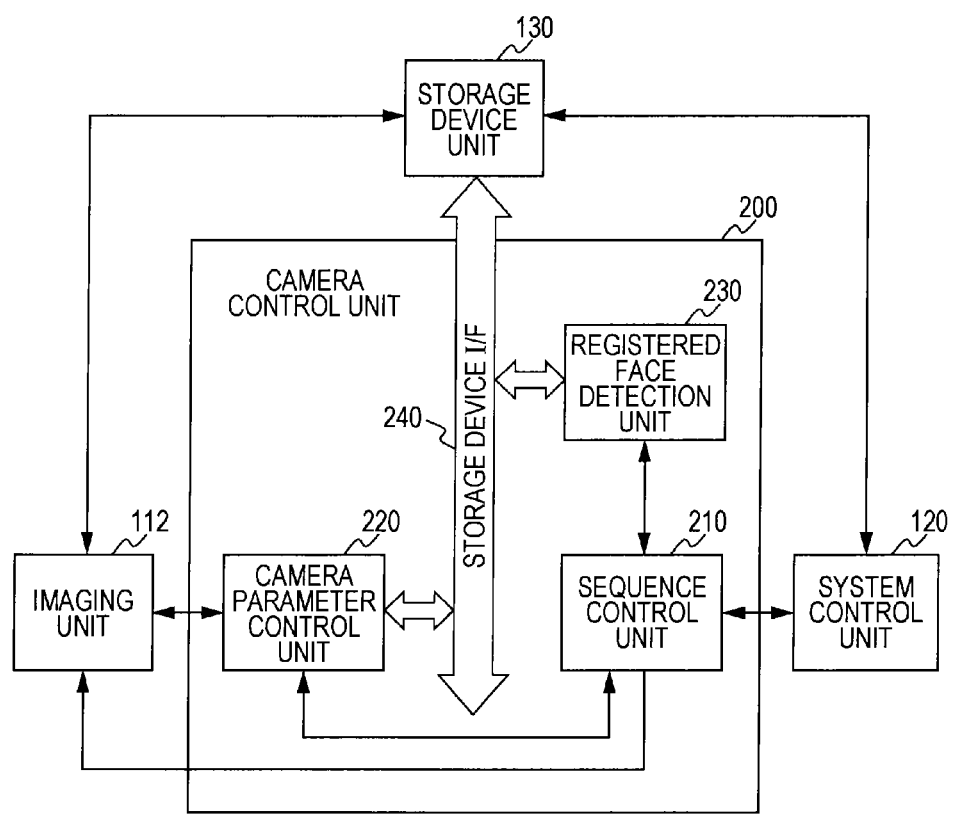
FIG. 2 is a block diagram showing a functional configuration example of a camera control unit according to the first embodiment of the present disclosure.

FIG. 2 is a block diagram showing a functional configuration example of the camera control unit 200 according to the first embodiment of the present disclosure. FIG. 2 shows the function configuration example of the camera control unit 200, and also shows a configuration of the imaging unit 112, the system control unit 120, and the storage device unit 130 shown in FIG. 1.

The camera control unit 200 includes a sequence control unit 210, a camera parameter control unit 220, a registered face detection unit 230, and a storage device I/F 240. Herein, exchanges of images between the storage device unit 130 and the camera parameter control unit 220, and between the storage device unit 130 and the registered face detection unit 230 are performed through the storage device I/F 240.

The sequence control unit 210 is activated by an image recording stand-by command from the system control unit 120 and saves the image generated by the imaging unit 112 in a recordable state. In the image recording stand-by state, images generated by the imaging unit 112 are sequentially stored in the storage device unit 130. For example, images stored in the storage device unit 130 are updated in an interval of 1/60 seconds. In addition, the sequence control unit 210 controls the camera parameter control unit 220 to determine camera parameters based on the current image stored in the storage device unit 130 (the latest image generated by the imaging unit 112). In addition, the sequence control unit 210 controls the registered face detection unit 230 to perform a registered image detection process for the current image stored in the storage device unit 130. Herein, when registered face detection information indicating that a registered face (registered face) is detected is output from the registered face detection unit 230, the sequence control unit 210 outputs the intent that a registered face is detected to the system control unit 120 and the camera parameter control unit 220.

The camera parameter control unit 220 determines camera parameters relating to an image, and performs imaging control for the imaging unit 112 using the determined camera parameters. Specifically, the camera parameter control unit 220 acquires the current image stored in the storage device unit 130 via the storage device I/F 240 based on trigger from the sequence control unit 210. Then, camera parameters including a shutter speed, exposure, white balance, and the like are determined by evaluating the current image. In addition, when the registered face is detected from the current image, the camera parameter control unit 220 determines the camera parameters including a shutter speed, exposure, white balance, and the like based on evaluation of the detected registered face and the current image. For example, when the registered face is detected, the optimum camera parameters for the detected registered face are determined based on the position and the size of the detected face in the image.

The registered face detection unit 230 performs a registered face detection process for the current image stored in the storage device unit 130, and outputs registered face detection information to the sequence control unit 210 when a registered face is detected. Specifically, the registered face detection unit 230 acquires the current image stored in the storage device unit 130 via the storage device I/F 240 based on trigger from the sequence control unit 210, and performs the registered face detection process for the current image. Herein, the registered face detection information is information relating to the detected registered face, and information including, for example, the position and the size of the detected face in the image and a score indicating the degree of the face. The registered face detection unit 230 will be described in detail with reference to FIG. 3.

[Configuration Example of Registered Face Detection Unit]

Figure 3:
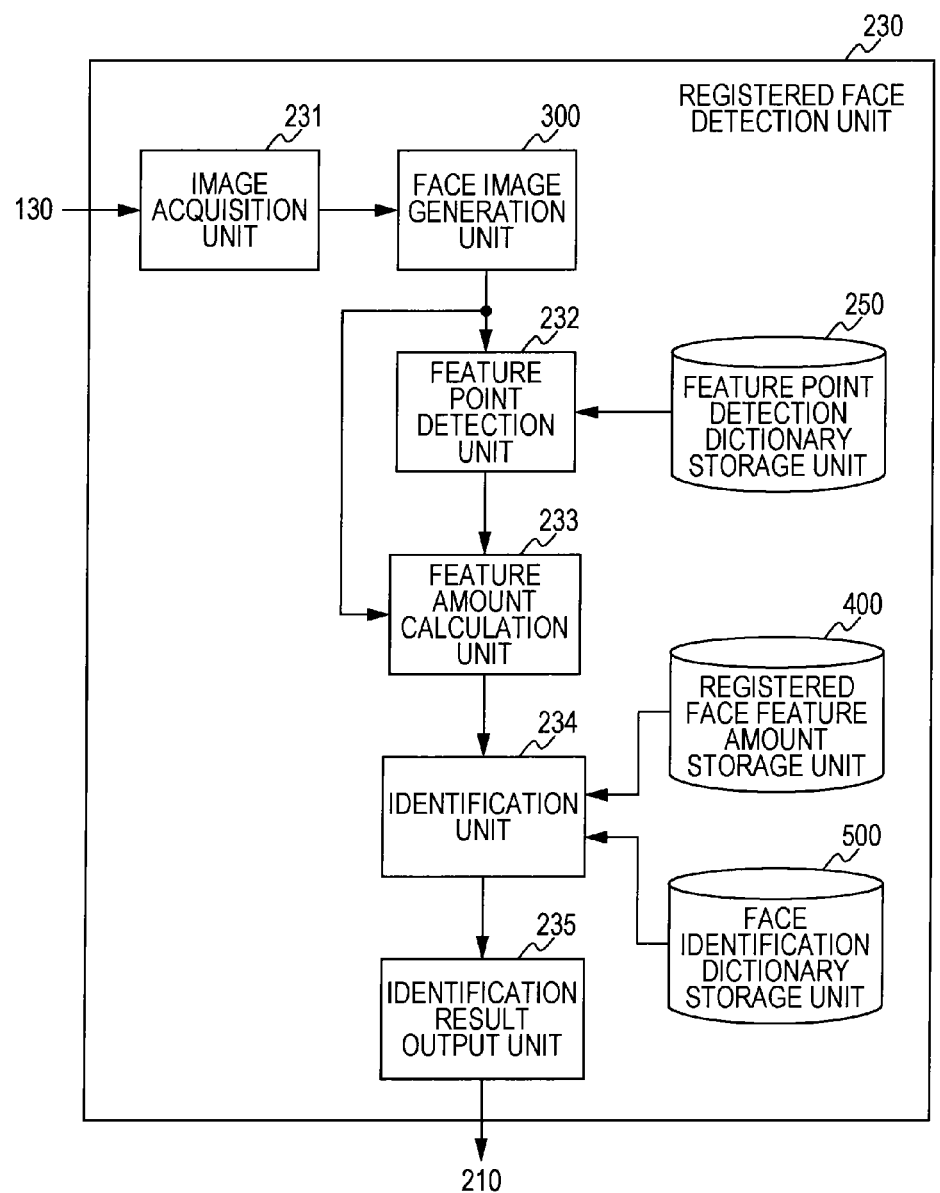
FIG. 3 is a block diagram showing a functional configuration example of a registered face detection unit according to the first embodiment of the present disclosure.

FIG. 3 is a block diagram showing a functional configuration example of the registered face detection unit 230 according to the first embodiment of the present disclosure.

The registered face detection unit 230 includes an image acquisition unit 231, a feature point detection unit 232, a feature amount calculation unit 233, an identification unit 234, and an identification result output unit 235. In addition, the registered face detection unit 230 includes a feature point detection dictionary storage unit 250, a face image generation unit 300, a face identification dictionary storage unit 500, and a registered face feature amount storage unit 400.

The image acquisition unit 231 acquires an image (image data) stored in the storage device unit 130 via the storage device I/F 240, and to output the acquired image to the face image generation unit 300.

The face image generation unit 300 generates an image including the face of a person (face image) from the image output from the image acquisition unit 231, and to output the generated face image to the feature point detection unit 232 and the feature amount calculation unit 233. In addition, details of the face image generation unit 300 will be described with reference to FIG. 4.

The feature point detection unit 232 detects feature points in the face included in the face image generated by the face image generation unit 300 using a feature point detection dictionary stored in the feature point detection dictionary storage unit 250, and to output the detection result (feature point information) to the feature amount calculation unit 233.

The feature point detection dictionary storage unit 250 stores the feature point detection dictionary that is used in a feature point detection process by the feature point detection unit 232, and to supply the stored feature point detection dictionary to the feature point detection unit 232. The stored content of the feature point detection dictionary storage unit 250 will be described in detail with reference to FIG. 6.

The feature amount calculation unit 233 calculates feature amounts for each feature point in the face image generated by the face image generation unit 300 (each feature point detected by the feature point detection unit 232), and to output the calculated feature amounts to the identification unit 234.

Herein, an area including a feature point and the periphery thereof in a specific target (for example, the face of a person) included in an image (for example, a face image) is set to a first area (for example, the feature point peripheral area 520 (m×n area) shown in FIG. 13A). In addition, when one pixel included in the first area is set to a reference pixel, the reference pixel and pixels around the reference pixel is set to a second area (for example, the comparison target area 522 (M×N area) shown in FIG. 13A). In this case, based on the comparison result of the feature amount of the reference pixel and the feature amounts of other pixels included in the second area relating to the reference pixel, the feature amount calculation unit 233 converts the feature amounts of other pixels for each pixel. Then, the feature amount calculation unit 233 computes (for example, an addition process) a value (for example, −1 or +1) of each pixel included in the second area obtained for each reference pixel for the position of each pixel included in the second area. Through the computation, the feature amount calculation unit 233 calculates feature amounts used in an identification process for identifying a specific target.

For example, when the feature amount of another pixel included in the second area relating to the reference pixel is great based on the feature amount of the reference pixel as a reference, the feature amount calculation unit 233 converts the feature amount into a first value. On the other hand, when the feature amount of another pixel included in the second area relating to the reference pixel is small based on the feature amount of the reference pixel as a reference, the feature amount calculation unit 233 converts the feature amount into a second value. In this case, the feature amount calculation unit 233 converts, for example, one of the first or the second value into a positive value (for example, +1), and the other one into a negative value (for example, −1). Furthermore, herein, the case of being great based on the feature amount of the reference pixel as a reference is set to include both meanings of being equal to the feature amount of the reference pixel and of being greater than the feature amount of the reference pixel. In addition, the case of being small based on the feature amount of the reference pixel as a reference is set to include both meanings of being equal to the feature amount of the reference pixel and being less than the feature amount of the reference pixel. However, when the case of being great based on the feature amount of the reference pixel as a reference indicates being equal to or greater than the feature amount of the reference pixel, the case of being small based on the feature amount of the reference pixel as a reference indicates being less than the feature amount of the reference pixel. On the other hand, when being great based on the feature amount of the reference pixel as a reference indicates being greater than the feature amount of the reference pixel, being small based on the feature amount of the reference pixel as a reference indicates being equal to or less than the feature amount of the reference pixel.

In addition, as shown in FIG. 15, feature amount calculation unit 233 calculates a feature amount, as a feature amount used in the identification process, having the computation result for each position of each pixel included in the second area as a constituent element. In addition, feature amount calculation unit 233 performs conversion for a plurality of feature points in the specific target, and calculates the feature amount of the plurality of feature points used in the identification process. A calculation process of the feature amount will be described in detail with reference to FIGS. 12A to 16B. In addition, the feature amount calculation unit 233 is an example of the conversion unit and the calculation unit described in the claims.

The registered face feature amount storage unit 400 stores a registered face feature amount used in the identification process by the identification unit 234, and to supply the stored registered face feature amount in the identification unit 234. Furthermore, the stored content of the registered face feature amount storage unit 400 will be described in detail with reference to FIGS. 9 to 10B.

The face identification dictionary storage unit 500 stores a face identification dictionary (statistical dictionary) used in the identification process by the identification unit 234, and supplies the stored face identification dictionary to the identification unit 234. Furthermore, the stored content of the face identification dictionary storage unit 500 will be described in detail with reference to FIGS. 11A and 11B.

The identification unit 234 performs a face determination process (identification process) for determining whether or not the face included in the face image generated by the face image generation unit 300 is a registered image. Then, the determination result (identification result) is output to the identification result output unit 235.

Specifically, the identification unit 234 acquires a registered face feature amount stored in the registered face feature amount storage unit 400 and performs an identification process by comparing the registered face feature amount to the feature amount calculated by the feature amount calculation unit 233 for each feature point per constituent element. In this case, a feature point and pixels thereof that serve as a comparison target is specified with the face identification dictionary stored in the face identification dictionary storage unit 500.

In other words, the face identification dictionary storage unit 500 stores one piece or plural pieces of determination information in the same type that includes a plurality of combinations of information relating to the feature point (feature point identification information), and the position and the threshold value of the feature amount. The identification unit 234 calculates the degree of similarity (for example, a difference value) between a feature amount corresponding to the position relating to the plurality of combinations included in the determination information (feature amount calculated by the feature amount calculation unit 233) and a registered face feature amount corresponding to the position by comparison. Then, the identification unit 234 calculates an evaluation value (score) based on the comparison result of the calculated degree of similarity and the threshold value relating to the combinations, and performs identification based on the score. The identification process by the identification unit 234 will be described in detail with reference to FIGS. 17A to 17C.

The identification result output unit 235 outputs the identification result by the identification unit 234 to the sequence control unit 210. When the determination result in which the face included in the face image is determined to be a registered face is output from the identification unit 234, for example, the identification result output unit 235 outputs registered face detection information indicating the intent that the registered face is detected to the sequence control unit 210. The registered face detection information includes, for example, the position and the size of the detected registered face in the image and a score indicating the degree of the face.

[Configuration Example of Face Image Generation Unit]

Figure 4:
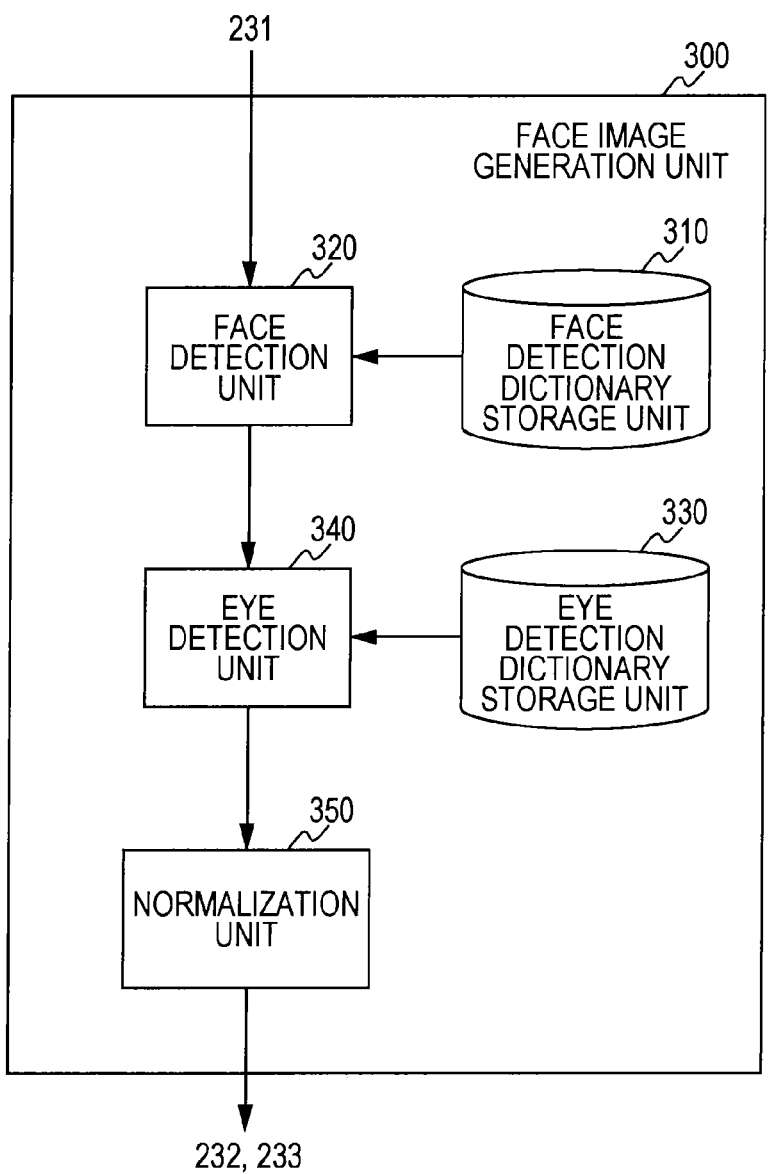
FIG. 4 is a block diagram showing a functional configuration example of a face image generation unit according to the first embodiment of the present disclosure.

FIG. 4 is a block diagram showing a functional configuration example of the face image generation unit 300 according to the first embodiment of the present disclosure.

The face image generation unit 300 includes a face detection dictionary storage unit 310, a face detection unit 320, an eye detection dictionary storage unit 330, an eye detection unit 340, and a normalization unit 350.

The face detection dictionary storage unit 310 stores a face detection dictionary used in a face detection process by the face detection unit 320, and supplies the stored face detection dictionary to the face detection unit 320.

The face detection unit 320 detects the face of a person included in the image output from the image acquisition unit 231, and outputs face detection information relating to the detected face to the eye detection unit 340. As a face detection method, for example, a face detection method that uses matching between a template in which luminance distribution information of a face is recorded and an actual image (for example, refer to Japanese Unexamined Patent Application Publication No. 2004-133637), a face detection method based on a portion of the skin color included in an image, the feature amount of the face of a person, and the like can be used. In addition, the face detection information includes the face image including the detected face, and the position and the size of the detected face in the image. Furthermore, the face detection unit 320 is an example of the specific target detection unit described in the claims.

The eye detection dictionary storage unit 330 stores an eye detection dictionary used in an eye detection process by the eye detection unit 340, and supplies the stored eye detection dictionary to the eye detection unit 340.

The eye detection unit 340 detects both eyes of the face detected by the face detection unit 320, and outputs eye information relating to the detected both eyes and the face detection information output from the face detection unit 320 to the normalization unit 350. In other words, the eye detection unit 340 detects both eyes in the face included in the image output from the image acquisition unit 231. As such an eye detection method, for example, an eye detection method that uses matching between a template in which luminance distribution information of eyes is recorded and an actual image, or the like can be used in the same manner as the face detection method. In addition, the eye information includes the position of the detected both eyes in the face image. With the eye information, it is possible to specify the positions of both eyes on the image. The positions of both eyes can be set to, for example, the center positions in both eyes.

The normalization unit 350 normalizes the face image relating to the face included in the image output from the image acquisition unit 231 based on the face detection information and the eye information output from the eye detection unit 340, and outputs the normalized face image to the feature point detection unit 232 and the feature amount calculation unit 233. The normalization unit 350 performs normalization for the face image detected by the face detection unit 320 using, for example, a normalization template. As the normalization template, for example, as shown in FIG. 5C, a normalization template 351 that has the positions of both eyes as references in the face image can be used. In other words, the normalization unit 350 implements a rotation process and an enlargement and reduction process for the face image output from the face detection unit 320 so that the positions of both eyes in the face image output from the eye detection unit 340 coincide with the positions of both eyes in the normalization template. Then, the normalization unit 350 normalizes the face image by implementing resolution conversion (for example, 80 pixels×80 pixels). Furthermore, the normalization of the face image will be described in detail with reference to FIGS. 5A to 5D.

[Face Image Generation Example]

FIGS. 5A to 5D are diagrams showing an example of generating the face image by the face image generation unit 300 according to the first embodiment of the present disclosure.

Figure 5A:
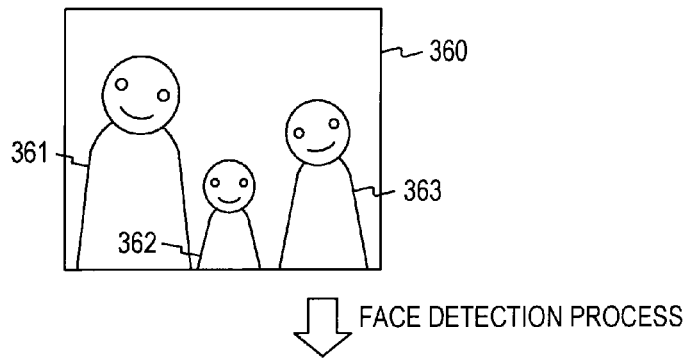
FIGS. 5A to 5D are diagrams showing an example of generating a face image by the face image generation unit according to the first embodiment of the present disclosure.

FIG. 5A briefly shows an image 360 generated by the imaging unit 112. The image 360 is set to include three persons 361 to 363. The face detection unit 320 performs a face detection process for the image 360 generated by the imaging unit 112 as above.

Figure 5B:
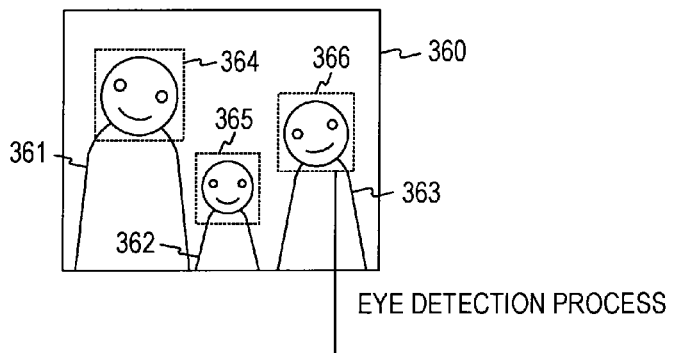
Figure 5C:
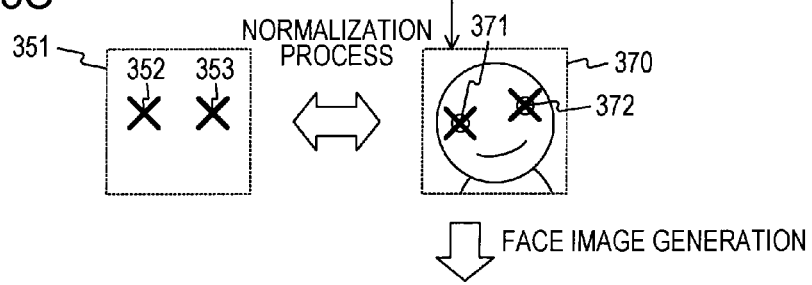

FIG. 5B schematically shows the detection result of the face detection process by the face detection unit 320. In other words, in the image 360, faces detected by the face detection unit 320 are shown by being surrounded with rectangles 364 to 366. In such a manner, the eye detection unit 340 performs an eye detection process for the faces (the faces in the rectangles 364 to 366) detected by the face detection unit 320.

FIG. 5C schematically shows the detection result of the eye detection process by the eye detection unit 340 and the normalization template 351 used in a normalization process by the normalization unit 350. FIG. 5c only shows an example of performing the normalization process for the face of the person 363 (the face in the rectangle 366) among the faces (the faces in the rectangles 364 and 366) detected by the face detection unit 320, but the normalization process can be performed for other faces in the same manner.

In addition, FIG. 5C shows the positions of the eyes detected by the eye detection unit 340 with × symbols 371 and 372 in the face image 370 taken out from the image 360. Furthermore, FIG. 5C shows an example of setting the positions of the eyes to the center positions in the eyes.

The normalization template 351 is a template used when the normalization unit 350 performs the normalization process, and defines reference positions 352 and 353 as references when performing normalization. In addition, the normalization unit 350 performs the normalization process so that the positions (× symbols 371 and 372) of both eyes in the face image 370 detected by the eye detection unit 340 accord with the reference positions 352 and 353 in the normalization template 351. In other words, the normalization process is performed so that the distance between the right and left eyes is fixed. Specifically, the normalization unit 350 performs a rotation process for the face image 370 and converts the resolution of the face image. The size of the face image is preferably set to a size to the extent that, for example, feature points in the face can be detected. For example, resolution conversion is performed so that the resolution of the face image is set to be 80 pixels×80 pixels and then a normalized face image is generated.

Figure 5D:
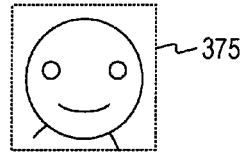

FIG. 5D briefly shows a normalized face image 375 that is generated by the normalization unit 350 in the normalization process.

As shown in FIG. 5D, for example, if resolution conversion and the rotation process are performed for the face image 370, a normalized face image (normalized face image 375) is generated. The positions of both eyes on the face of the person 363 included in the normalized face image 375 matches with the reference positions 352 and 353 in the normalization template 351 shown in FIG. 5C.

Furthermore, as a reference position, the position of other organ other than both eyes included in the face may be used. In addition, the positions of a plurality of organs may be used as reference positions.

[Content Example of Feature Point Detection Dictionary Storage Unit]

FIG. 6 is a diagram schematically showing an example of stored content of the feature point detection dictionary storage unit 250 according to the first embodiment of the present disclosure.

The feature point detection dictionary storage unit 250 stores the feature point detection dictionary for detecting feature points in the face of a person included in the face image generated by the face image generation unit 300. The feature point detection dictionary storage unit 250 stores feature point identification information 251 and a feature point detection dictionary 252 in a corresponding manner.

The feature point identification information 251 is identification information for identifying each feature point in the face of a person. Furthermore, in the first embodiment of the present disclosure, an example where the number of feature points to be detected is set to K (for example, K=70) will be described.

The feature point detection dictionary 252 is information for detecting feature points in the face of a person included in the face image generated by the face image generation unit 300. In other words, the feature point detection unit 232 detects feature points in the face of a person included in the face image generated by the face image generation unit 300 using the feature point detection dictionary 252.

For example, as a feature point detection method, a detection method that uses matching of a template in which luminance distribution information of each feature point is recorded and an actual image can be used, in the same manner as the face detection method and the eye detection method. As such, when the detection method by matching is used as a feature point detection method, the template recorded with luminance distribution information of each feature point is stored as the feature point detection dictionary 252. For example, a template 253 that is used for detecting the left edge part of the left eye as a feature point, a template 254 that is used for detecting the left edge part of the nose as a feature point, a template 255 that is used for detecting the left edge part of the mouth as a feature point, and the like are stored. As such, a part (the edge part, or the like) of an organ that has a difficulty in depending on an individual difference such as the tail of an eye, the tip of the nose, or the like is used as a feature point in the face.

[Detection Example of Feature Point]

Figure 7A:
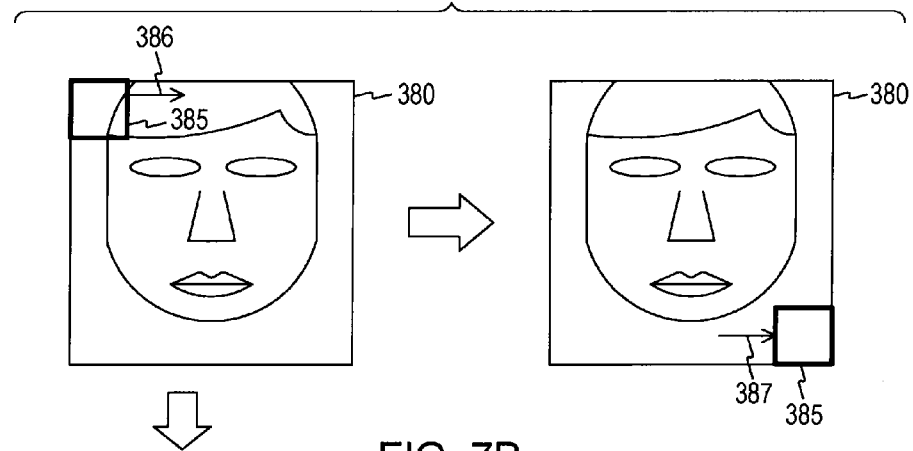
FIGS. 7A to 7C are diagrams showing a detection example when feature points of a face are detected by a feature point detection unit according to the first embodiment of the present disclosure.
Figure 7B:
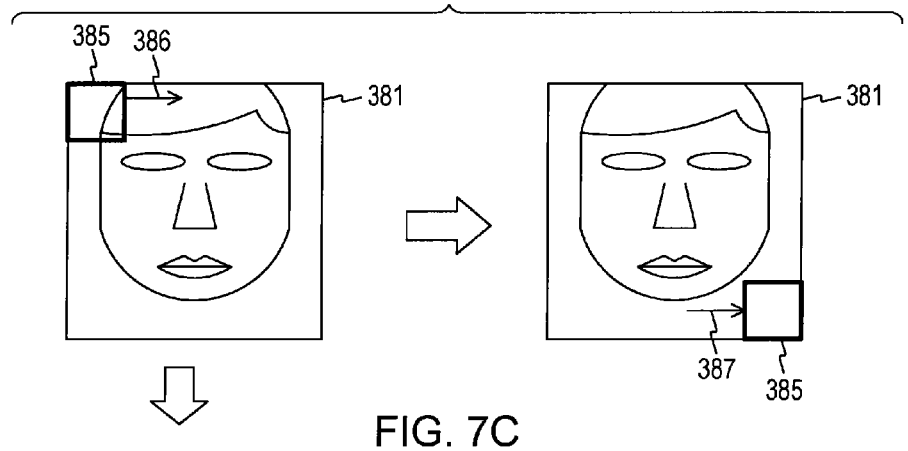
Figure 7C:
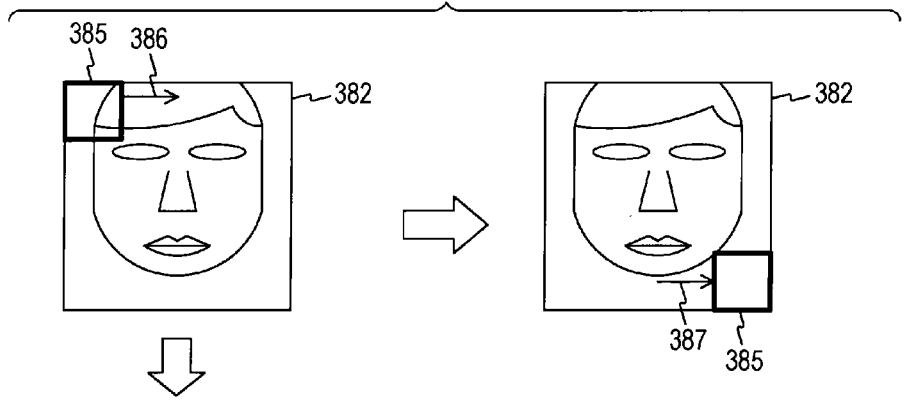

FIGS. 7A to 7C are diagrams showing a detection example when feature points of a face are detected by the feature point detection unit 232 according to the first embodiment of the present disclosure.

FIGS. 7A to 7C show a transition example of face images (face images 380 to 382) used for detecting feature amounts thereof. In other words, FIG. 7A shows the face image 380 generated by the face image generation unit 300, and FIGS. 7B and 7C show the face images 381 and 382 that is obtained by performing a reduction process for the face image 380. Furthermore, the face image 380 can be set as an image, for example, with 80 pixels×80 pixels. In addition, the reduction process can be set to reduce the image to, for example, 0.83 times thereof.

When feature amounts are to be detected for the face image 380, for example, a takeoff frame 385 is disposed on the upper left corner of the face image 380 as shown in the left side of FIG. 7A, and the feature point detection unit 232 performs the feature point detection process (for example, a matching process) for the image included in the take-off frame 385. Subsequently, the takeoff frame 385 is shifted by one pixel to the right direction (the direction indicated by the arrows 386 and 387), and the feature point detection process is performed for the image included in the takeoff frame 385.

In the same manner thereafter, the takeoff frame 385 is sequentially shifted by one pixel to the right direction, and the feature point detection process is sequentially performed for the image included in the takeoff frame 385. Then, after the takeoff frame 385 is shifted to the position at the right end of the face image 380 and the feature point detection process is performed for the image included in the frame, the takeoff frame 385 is shifted to the lower side by one pixel and then moves to the left end of the face image 380.

Subsequently, after the feature point detection process is performed for the image included in the takeoff frame 385 immediately after the movement to the left end of the face image 380, the takeoff frame 385 is sequentially shifted by one pixel to the right direction and the feature point detection process is performed for the image included in the takeoff frame 385.

In the same manner thereafter, the feature point detection process is sequentially performed for the image included in the takeoff frame 385. Then, when as shown in the right side of FIG. 7A, the takeoff frame 385 is shifted to the position at the right end and the lower end of the face image 380 and the image included in the takeoff frame 385 is taken off, the feature point detection process for the face image 380 ends.

In addition, the feature point detection process is performed for the face images 381 and 382 (the face images obtained by performing the reduction process for the face image 380) shown in FIGS. 7B and 7C in the same manner. Furthermore, the face images 381 and 382 in the left side of FIGS. 7B and 7C show the first positions where the takeoff frames 385 are disposed, and the face images 381 and 382 in the right side of the FIGS. 7B and 7C show the final positions where the takeoff frames 385 are disposed. Herein, the movement of the takeoff frame 382 from the first disposed position to the final disposed position is the same as the movement shown in FIG. 7A. In addition, the size of the takeoff frame 385 is fixed regardless of the sizes of the face images of which feature points are to be detected. In addition, the feature point detection process is performed until the sizes of the face images of which feature points are to be detected become equal.

Figure 8:
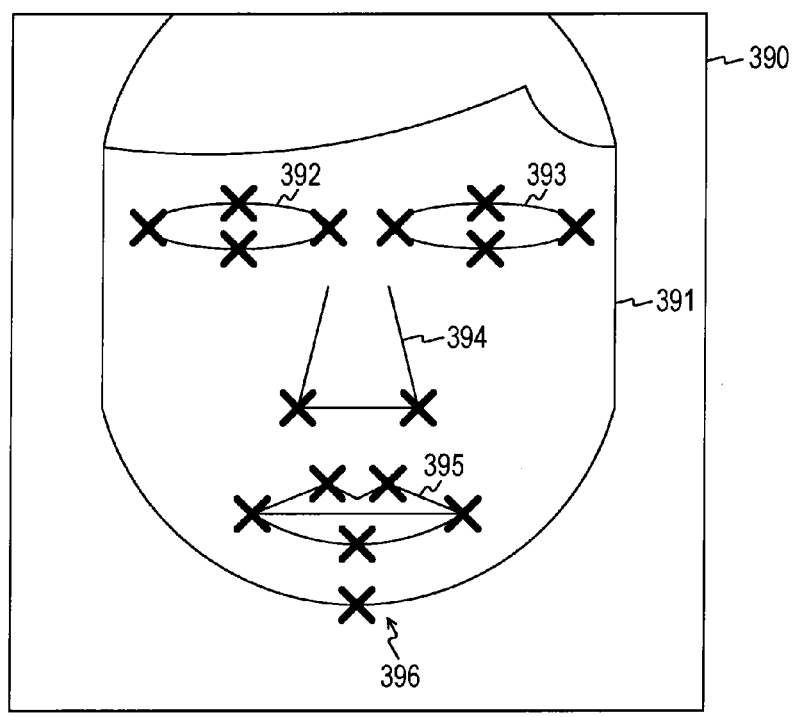
FIG. 8 is a diagram schematically showing a face image as a target of a feature point detection process by the feature point detection unit and the detection result of the feature point detection process according to the first embodiment of the present disclosure.

FIG. 8 is a diagram schematically showing a face image 390 as a target of the feature point detection process by the feature point detection unit 232 and the detection result of the feature point detection process according to the first embodiment of the present disclosure. The face image 390 shown in FIG. 8 is the same as the face image 380 shown in FIG. 7A, and includes the face 391 of a person.

In addition, FIG. 8 schematically shows the positions of feature points detected in the face 391 included in the face image 390 with thick-lined × symbols. In addition, FIG. 8 only shows representative feature point among feature points to be detected for the sake of simple description. For example, edges of each part (organ) on the face including the eyes 392 and 393, the nose 394, the mouth 395, the chin 396, and the like in the face 391 are detected as feature points.

As such, the feature amount calculation unit 233 calculates feature amounts for each feature point detected by the feature point detection unit 232.

[Content Example of Registered Face Feature Amount Storage Unit]

FIG. 9 is a diagram schematically showing an example of stored content of the registered face feature amount storage unit 400 according to the first embodiment of the present disclosure.

The registered face feature amount storage unit 400 stores feature amounts relating to the face (registered face) of a person to be subject to an identification process by the identification unit 234. The registered face feature amount storage unit 400 stores individual identification information 401, a name 402, registered face information 403, and a feature amount 404 in a corresponding manner.

The individual identification information 401 is identification information for identifying a person whose face is registered as a registered face.

The name 402 is the name of a person whose face is registered as a registered face. Furthermore, in the field of the name 402, a nickname, a stage name, or the like other than a full name may be stored. When a registered face is detected by the registered face detection unit 230, for example, it is possible to display information relating to the person of the detected face (the full name, the nickname, or the like) based on the information stored in the name 402.

The registered face information 403 is information relating to the face of a person whose face is registered as a registered face. The registered face information 403 stores, for example, an image including the face of a person whose face is registered as a registered face (registered face image).

The feature amount 404 is a feature amount relating to a registered face (registered face feature amount). Furthermore, the relationship between a registered face and the feature amounts will be described in detail with reference to FIGS. 10A and 10B.

Figures 10A, 10B:
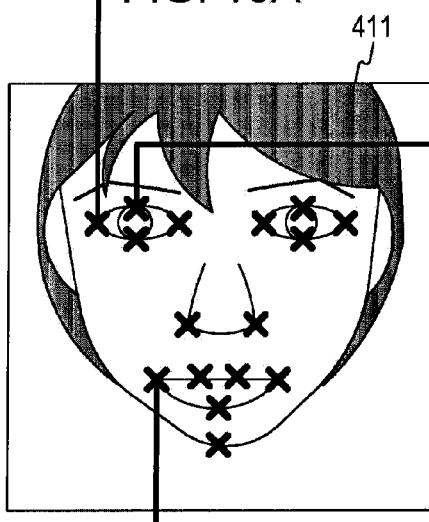
FIGS. 10A and 10B are diagrams schematically showing a relationship example between feature amounts stored in the registered face feature amount storage unit and a registered face according to the first embodiment of the present disclosure.

FIGS. 10A and 10B are diagrams schematically showing a relationship example between the feature amounts stored in the registered face feature amount storage unit 400 and a registered face according to the first embodiment of the present disclosure.

FIG. 10A shows an example of the registered face information 403 relating to a person whose feature amounts are stored in the registered face feature amount storage unit 400. FIG. 10A briefly shows a registered face image 411 of Yoshiko Heitani (#102 of the individual identification information 401) shown in FIG. 9 as the registered face information 403. In addition, FIG. 10A schematically shows a part of the feature points in the registered face image 411 by × symbols. The feature points correspond to the feature points detected by the feature point detection unit 232.

FIG. 10B shows an example of a feature amount 404 stored in the registered face feature amount storage unit 400. FIG. 10B schematically shows a part of feature amounts calculated for each feature point in the registered face image 411 shown in FIG. 10A as the feature amount 404.

As shown in FIG. 10B, a feature amount 412 is stored in a unit of a feature point in the registered face image 411. In addition, the feature amount 412 is constituted by 24 (5×5−1) elements for each feature point. Furthermore, the 24 elements constituting the feature amount 412 will be described in detail with reference to FIGS. 12A to 16B.

[Content Example of Face Identification Dictionary Storage Unit]

Figures 11A, 11B:
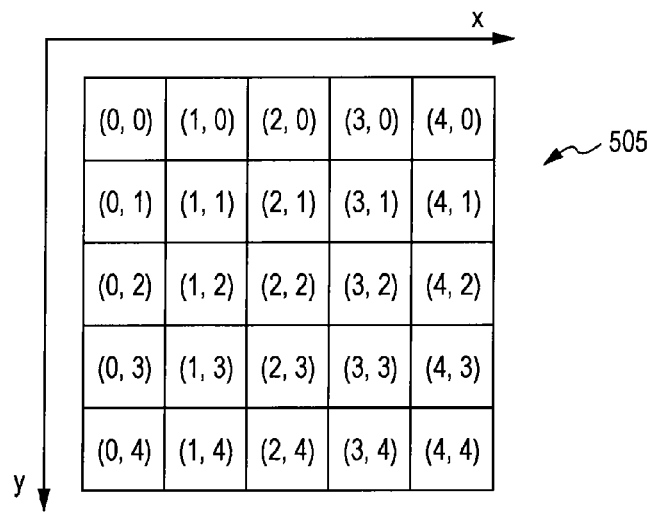
FIGS. 11A and 11B are diagrams schematically showing an example of stored content of a face identification dictionary storage unit according to the first embodiment of the present disclosure.

FIGS. 11A and 11B are diagrams showing an example of stored content of the face identification dictionary storage unit 500 according to the first embodiment of the present disclosure.

FIG. 11A shows an example of the stored content of the face identification dictionary storage unit 500. In addition, FIG. 11B shows xy coordinates corresponding to positional information (x,y) 502 shown in FIG. 11A.

The face identification dictionary storage unit 500 is determination information for performing the identification process for the face image generated by the face image generation unit 300. In addition, the face identification dictionary storage unit 500 is determination information for identifying the face of a person whose feature amounts are registered in the registered face feature amount storage unit 400 (registered face).

The face identification dictionary storage unit 500 stores L groups of combinations of feature point identification information 501, positional information (x,y) 502, a threshold value (th) 503, and a score (α) 504. L can be set to, for example, around 1000.

The feature point identification information 501 stores identification information of feature points corresponding to feature amount to be compared among feature amounts in the unit of feature point. The feature point identification information 501 stores, for example, identification information of the feature points corresponding to the feature amounts to be compared out of the feature point identification information 413 shown in FIG. 10B (from #0 to #(K−1)).

The positional information (x,y) 502 stores the positions of feature amounts to be compared. When the feature amounts (for example, the feature amount 414 shown in FIG. 10B) are made to correspond to the xy coordinates (planar coordinates), the positional information (x,y) 502 stores, for example, coordinate points (x,y) having one in the upper left corner of the xy coordinates as the origin.

Herein, information stored in the feature point identification information 501 and the positional information (x,y) 502 will be described. In the rectangles constituting a rectangle group 505 shown in FIG. 11B, the upper left corner is set to be, for example, the origin, the horizontal direction to the x axis and the vertical direction to the y axis. In this case, a case is assumed where the positions of the feature amounts (shown as a rectangle 415) shown in FIG. 10B are stored in the feature point identification information 501 and the positional information (x,y) 502. In this case, "#1" is stored in the feature point identification information 501 stores, and "0" is stored for x and "2" is stored for y in the positional information (x,y) 502.

In the threshold value (th) 503, a threshold value relating to the difference value of two feature amounts to be compared is stored. The two feature amounts to be compared are two feature amounts specified by the feature point identification information 501 and the positional information (x,y) 502 (a feature amount in the registered face feature amount storage unit 400 (registered face feature amount) and a feature amount calculated by the feature amount calculation unit 233).

In the score (α) 504, a value used in calculation of a score for performing the identification process is stored. The score is an evaluation value indicating the degree of a registered face. Furthermore, the calculation of a score indicating the degree of a registered face performed using such a value will be described in detail with reference to FIGS. 17A to 17C.

In addition, such a value is set using combinations of top 1000 groups that are most effective among values learned by a machine learning algorithm, for example, AdaBoost, or the like. For images that serve as such learning target, for example, a face image including a registered face and a face image not including a registered face are used. In addition, a face identification dictionary used in a determination process is determination information that retains data only relating to a determination reference for determining whether or not a target image includes a registered image, and does not retain images for themselves. For this reason, the volume to be stored can be reduced, and the determination process can be rapidly performed. Furthermore, as the machine learning algorithm, an SVM (Support Vector Machine), Real AdaBoost, or the like may be used.

[Calculation Example of Feature Amount]

Figure 12A:
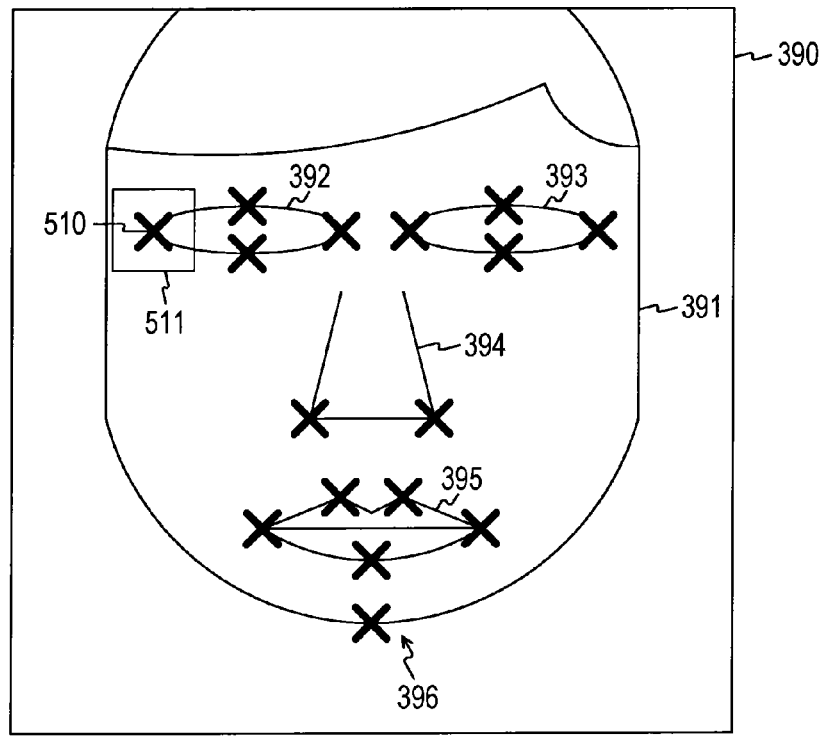
FIGS. 12A and 12B are diagrams briefly showing a face image that is the target of a feature amount calculation process by a feature amount calculation unit and a target area used when feature amounts are calculated for the face image according to the first embodiment of the present disclosure.
Figure 12B:
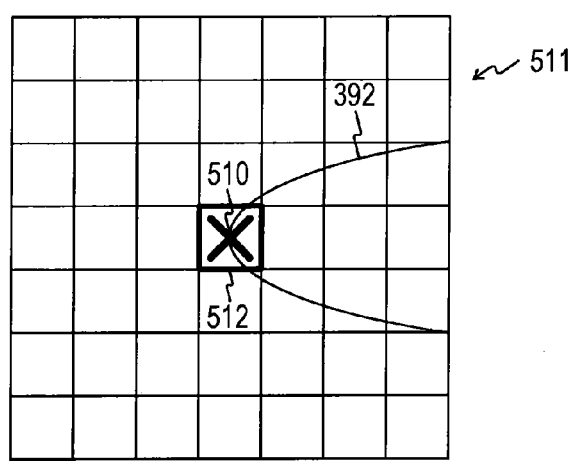

FIGS. 12A and 12B are diagrams briefly showing a face image that is the target of a feature amount calculation process by the feature amount calculation unit 233 and a target area used when feature amounts are calculated for the face image according to the first embodiment of the present disclosure. Furthermore, the face image 390 shown in FIG. 12A is the same as that in FIG. 8 except for the point that an area 511 is added thereto.

FIG. 12B shows a part of the area (area 511) in the face image 390 by enlargement. In other words, the area 511 is a rectangular area including a feature point 510 detected in the face image 390, and an area used when feature amounts are calculated for the feature point 510. Furthermore, FIG. 12B schematically shows each pixel included in the area 511 with rectangles. In addition, the face image 390 is an image constituted by, for example 80 pixels×80 pixels, and the area 511 in the face image 390 is an area constituted by, for example, 7 pixels×7 pixels as shown in FIG. 12B.

FIGS. 13A to 13C are diagrams schematically showing pixels used for the feature amount calculation by the feature amount calculation unit 233 according to the first embodiment of the present disclosure.

FIG. 13A shows each pixel included in the area 511 shown in FIG. 12B by giving identification numbers 1 to 49 therein. Furthermore, hereinbelow, each pixel will be described by assigning the identification number thereof. For example, a pixel 512 corresponding to the feature point 510 shown in FIG. 12B is a pixel 5 shown in FIG. 13A. In addition, the rectangle corresponding to the feature point peripheral area 520 is indicated by a thick line. Herein, the feature point peripheral area 520 is a peripheral area including the feature point (an area of m pixel×n pixel (m×n area)). In addition, each pixel included in the feature point peripheral area 520 is sequentially selected as a pixel that serves a reference (a reference pixel) when feature amounts are calculated.

For example, a feature amount calculation example when a pixel 1 (indicated by being surrounded by a rectangle 521) is selected as a reference pixel will be described. When the pixel 1 is selected as a reference pixel, a rectangular area having the pixel 1 as the center (an area of M pixel×N pixel (M×N area)) is set as the comparison target area 522. The comparison target area 522 is shown in FIG. 13B.

Herein, parameters (M×N, m×n) of the feature point peripheral area (m×n area) and the comparison target area (M×N area) are set in advance, and the set parameters are retained in the feature amount calculation unit 233.

For example, a range that includes sufficient characteristic texture in the periphery of the feature point to be detected is set as the comparison target area (M×N area). In addition, an area that encompasses detection errors of the feature point in the face is set as the feature point peripheral area (m×n area).

For example, when a feature amount is to be detected with detection accuracy that includes an error of one pixel, m×n is set to be 3×3. In addition, when a feature amount is to be detected with detection accuracy that includes an error of two pixels, m×n is set to be 5×5.

Furthermore, when a positional error in feature point detection has statistical anisotropy, the anisotropy may be held in a direction where such a positional error easily occurs (for example, m×n=3×5). In addition, if an area encompasses a detection error, it is not necessary for the area to be a rectangular area of m×n, and may be an arbitrary shape having a feature point as the center thereof.

In addition, if the comparison target area (the area of M pixel×N pixel (M×N area)) is set to include an area that is assumed that an error occurs in the detection process of the feature point in the face and can encompass the error area, it is not necessary to be a rectangle, and can be an area with an arbitrary shape. This matter will be described in a second embodiment of the present disclosure.

FIG. 13B only shows the comparison target area 522 in the area 511 shown in FIG. 13A. In addition, the reference pixel (pixel 1) is indicated by a thick line. Herein, the feature amount calculation unit 233 sequentially compares the luminance component (Y component) of the reference pixel (pixel 1) and the luminance component of another pixel, and encodes the pixel other than the reference pixel (pixel 1). For example, when the luminance component of the reference pixel (pixel 1) is compared to the luminance component of another pixel and the luminance component of the pixel that serves as the comparison target is equal to or higher than the luminance component of the reference pixel (pixel 1), the pixel that serves as the comparison target is encoded as "+1". In addition, for example, when the luminance component of the reference pixel (pixel 1) is compared to the luminance component of another pixel and the luminance component of the pixel that serves as the comparison target is less higher than the luminance component of the reference pixel (pixel 1), the pixel that serves as the comparison target is encoded as "−1". In other words, using the following Formula 1, encoding is performed for each pixel f(x,y) other than the reference pixel (pixel 1).

$f(x,y)=+1$ (however, in the case where $I(x,y)P$)

$f(x,y)=-1$ (however, in the case where $I(x,y)<P$)   Formula 1

Herein, x and y denote coordinate positions in the comparison target area 522 (in other words, x, y ∈ {a coordinate in the comparison target area 522}). In addition, P is a value of the luminance component of the reference pixel (pixel 1). In addition, I(x,y) is a value of the luminance component of a coordinate (x,y) in the comparison target area 522.

As such, values encoded for each pixel (encoded information 525) other than the reference pixel (pixel 1) are shown in FIG. 13C.

FIG. 13C shows values of each pixel (each pixel other than the reference pixel (pixel 1)) encoded in the comparison target area 522 shown in FIG. 13B as the encoded information 525. Furthermore, in FIG. 13C, encoded values ("+1" and "−1") are given to the rectangles of the corresponding pixels.

In addition, encoded information is generated also for other pixels (pixel 2 to 9) included in the feature point peripheral area 520 in the same manner. In other words, the pixels 2 to 9 are sequentially selected as reference pixels, and encoded information is generated for the reference pixels. As such, an example of encoded information calculated for each pixel (pixels 1 to 9) included in the feature point peripheral area 520 is shown in FIGS. 14A to 14C.

Figure 14A:
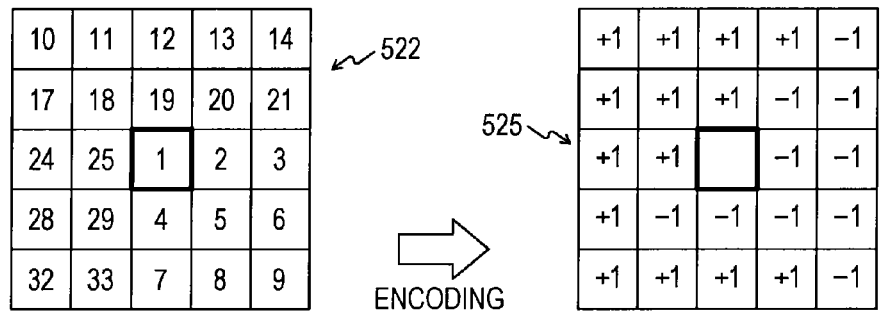
FIGS. 14A to 14C are diagrams schematically showing the relationship between a comparison target area used for feature amount calculation by the feature amount calculation unit and encoded information calculated for the comparison target area according to the first embodiment of the present disclosure.
Figure 14B:
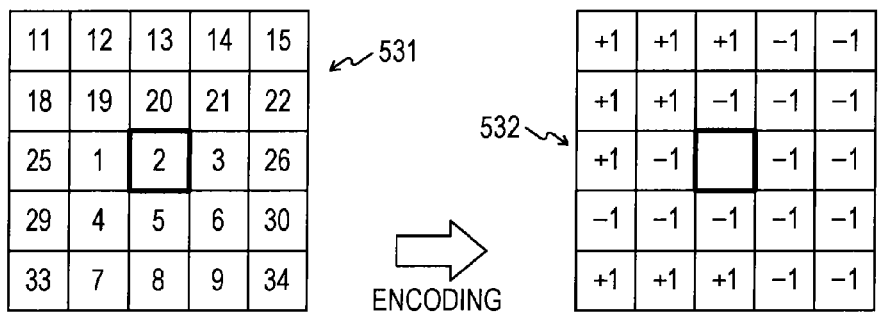
Figure 14C:
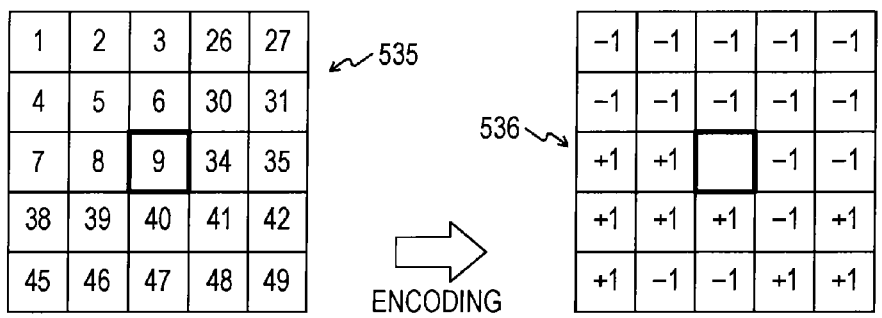

FIGS. 14A to 14C are diagrams schematically showing the relationship between the comparison target area used for feature amount calculation by the feature amount calculation unit 233 and encoded information calculated for the comparison target area according to the first embodiment of the present disclosure.

FIG. 14A shows the comparison target area 522 used when the encoded information for the pixel 1 included in the feature point peripheral area 520 is calculated and the encoded information 525 calculated for the pixel 1 included in the feature point peripheral area 520. Furthermore, the comparison target area 522 and the encoded information 525 shown in FIG. 14A are the same as the comparison target area 522 shown in FIG. 13B and the encoded information 525 shown in FIG. 13C.

FIG. 14B shows a comparison target area 531 used when the encoded information for the pixel 2 included in the feature point peripheral area 520 is calculated and encoded information 532 calculated for the pixel 2 included in the feature point peripheral area 520.

FIG. 14C shows a comparison target area 535 used when the encoded information for the pixel 9 included in the feature point peripheral area 520 is calculated and encoded information 536 calculated for the pixel 9 included in the feature point peripheral area 520.

Furthermore, the reference pixels for the comparison target area 522, 531 and 535 shown in FIGS. 14A to 14C are indicated by being surrounded with thick lines. In addition, the rectangles corresponding to the positions of the reference pixels for the encoded information 525, 532, and 536 shown in FIGS. 14A to 14C are indicated as white rectangles by being surrounded with thick lines. Furthermore in FIGS. 14A to 14C, the comparison target areas and encoded information for the pixels 3 to 8 included in the feature point peripheral area 520 are omitted in the drawings.

As such, the encoded information for each pixel (pixels 1 to 9) included in the feature point peripheral area 520 is calculated. By performing an addition process by the feature amount calculation unit 233 for each piece of the encoded information calculated as above, feature amounts are calculated. An example thereof is shown in FIGS. 15A and 15B.

FIGS. 15A and 15B are diagrams schematically showing the relationship between each piece of the encoded information calculated by the feature amount calculation unit 233 and feature amounts calculated in the addition process of the encoded information according to the first embodiment of the present disclosure.

FIG. 15A shows the encoded information 525, 532, and 536 calculated for each pixel (pixels 1 to 9) included in the feature point peripheral area 520. Furthermore, the encoded information 525, 532, and 536 is the same as that in FIGS. 14A to 14C. In addition, in FIG. 15A, the encoded information for the pixels 3 to 8 included in the feature point peripheral area 520 is omitted in the drawings, as in FIGS. 14A to 14C.

FIG. 15B schematically shows a feature amount 540 calculated in the addition process of the encoded information calculated for each pixel (pixels 1 to 9) included in the feature point peripheral area 520. In other words, the feature amount 540 is calculated by sequentially adding, for each element, the values ("+1" or "−1") of the elements (24) of the nine pieces of the encoded information calculated for the pixels (pixels 1 to 9) included in the feature point peripheral area 520. In other words, in the xy coordinate of the encoded information, the values (nine values) of the same element are sequentially added, thereby calculating a value for the element. For the value of an element 541 constituting the feature amount 540, for example, the calculation is fulfilled by sequentially adding values at the same position (for example, indicated by rectangles 542 to 544 in dotted lines) as the position of the element 541 in the xy coordinate corresponding to the feature amount 540. In other words, each element F(x,y) constituting the feature amount is calculated using the following Formula 2.

$$F(x, y) = \sum_{x', y'} f(x, y) \quad \text{Formula 2}$$

Herein, x and y denote coordinate positions in the comparison target area (M×N area) (in other words, $x, y \in \{$a coordinate in the comparison target area (M×N area)$\}$). In addition, x' and y' denote coordinate positions in the feature point peripheral area (m×n area) (in other words, $x', y' \in \{$a coordinate in the feature point peripheral area (m×n area)$\}$). Herein, since the values of the elements (24) of the nine pieces of encoded information are "+1" or "−1", a value a of each element constituting the feature amount 540 becomes a value in a fixed range ($-9 \leq a \leq +9$).

In addition, a feature amount for another feature point is calculated in the same manner. In other words, using the following Formula 3, each element F(k,x,y) constituting the feature amount is calculated for each feature point.

$$F(k, x, y) = \sum_{x', y'} f(k, x, y) \quad \text{Formula 3}$$

Wherein, x, y, x' and y' are the same as those in Formula 2. In addition, k denotes feature point identification information (in other words, k=0 to K−1).

Figures 16A, 16B:
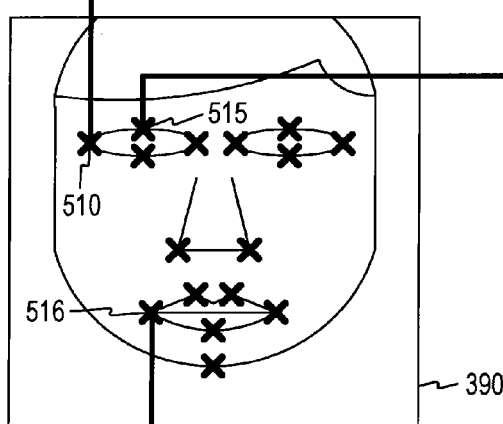
FIGS. 16A and 16B are diagrams schematically showing the relationship between a face image that is the target of a feature amount calculation process by the feature amount calculation unit and feature amounts calculated for each feature point in the face image according to the first embodiment of the present disclosure.

In addition, FIGS. 16A and 16B show an example of the feature amount calculated for each feature point. In addition, the feature amount calculated as above can be referred to as a GHF (Gradient Histogram Feature).

FIGS. 16A and 16B are diagrams schematically showing the relationship between the face image that is the target of the feature amount calculation process by the feature amount calculation unit 233 and feature amounts calculated for each feature point in the face image according to the first embodiment of the present disclosure. Furthermore, the face image 390 shown in FIG. 16A is the same as that in FIG. 8.

FIG. 16B schematically shows the feature amounts 540, 545, and 546 calculated for each feature point in the face image 390. Furthermore, the feature amount 540 is the same as that in FIG. 15B. In addition, the feature amount 545 is set to be a feature amount calculated for a feature point 515 in the face image 390 and the feature amount 546 is set to be a feature amount calculated for a feature point 516 in the face image 390. In addition, such relationships are shown by connection with thick-lined arrows. Furthermore, in FIGS. 16A and 16B, feature amounts other than the feature amounts 540, 545, and 546 calculated for the feature points 510, 515, and 516 are omitted in the drawings.

As such, the feature point detection unit 232 detects each feature point in the face image 390 generated by the face image generation unit 300. Subsequently, the feature amount calculation unit 233 calculates the feature amounts for each feature point detected in the face image 390.

In addition, the registered face feature amount storage unit 400 stores the feature amounts calculated in advance by the above-described calculation process (for example, the feature amount 412 shown in FIG. 10B).

Using the feature amounts calculated for each feature point as above, the identification unit 234 performs the identification process. An example thereof is shown in FIGS. 17A to 17C.

[Identification Example of Registered Face]

Figure 17A:
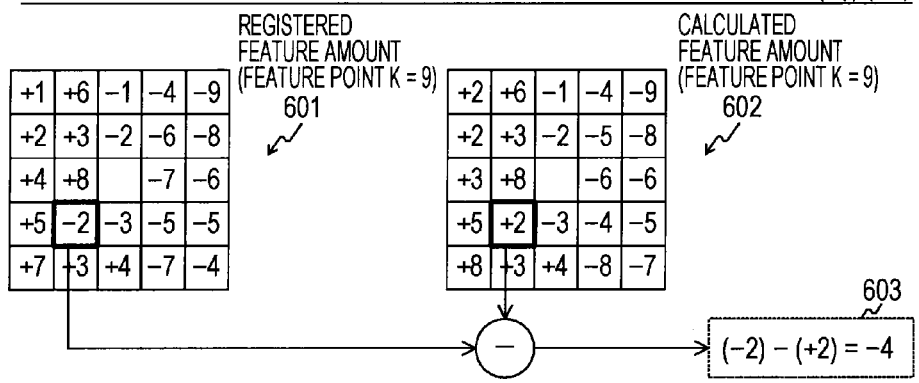
FIGS. 17A to 17C are diagrams schematically showing a calculation method when a score used in an identification process by an identification unit is calculated according to the first embodiment of the present disclosure.
Figure 17B:
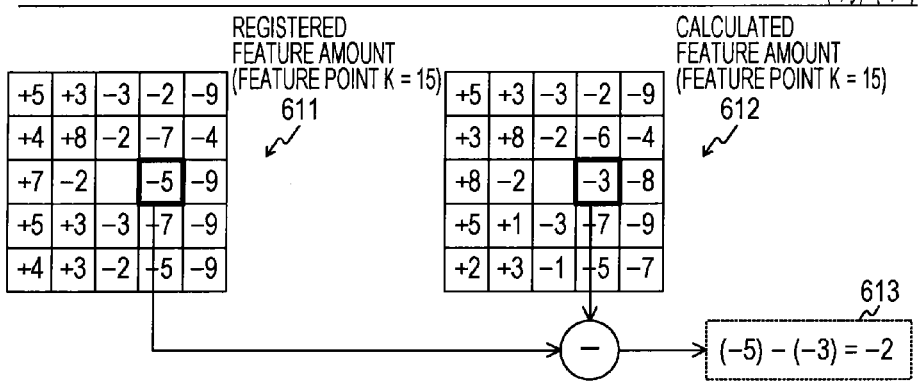
Figure 17C:
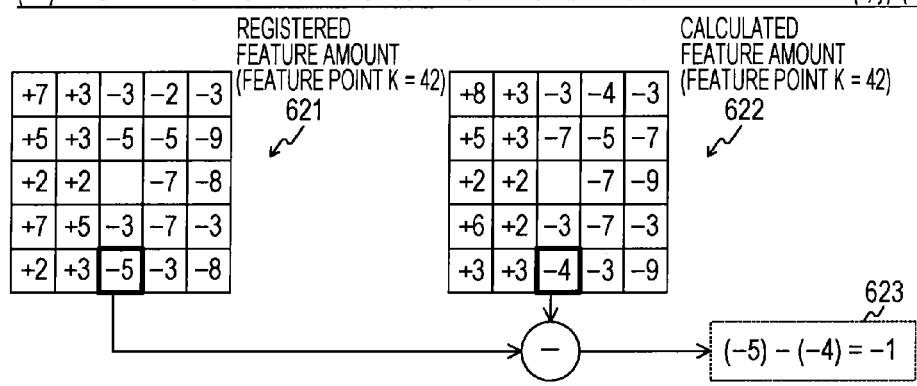

FIGS. 17A to 17C are diagrams schematically showing a calculation method when a score used in the identification process by the identification unit 234 is calculated according to the first embodiment of the present disclosure.

First, the identification unit 234 acquires two feature amounts A(i) and B(i) used in the identification process. Herein, the feature amount A(i) indicates a feature amount specified by the feature point identification information 501 and the positional information (x,y) 502 of the face identification dictionary storage unit 500 among feature amounts stored in the registered face feature amount storage unit 400. In addition, the feature amount B(i) indicates a feature amount specified by the feature point identification information 501 and the positional information (x,y) 502 of the face identification dictionary storage unit 500 among feature amounts calculated by the feature amount calculation unit 233. Furthermore, i is a value indicating each record of the face identification dictionary storage unit 500, and $0 \leq i < L-1$.

Subsequently, the identification unit 234 calculates a difference value D(i) of the two acquired values. Herein, the difference value D(i)=A(i)−B(i).

Subsequently, the identification unit 234 compares the threshold value th(i) stored in the threshold value (th) 503 of the face identification dictionary storage unit 500 to the difference value D(i). Then, the identification unit 234 calculates a weak hypothesis (Weak Learner) h(i) based on the comparison result of the threshold value th(i) and the difference value D(i). Specifically, the weak hypothesis h(i) is calculated using the following formulas.

If the difference value D(i)≤the threshold value th(i), the weak hypothesis h(i)=1; and if the difference value D(i)>the threshold value th(i), the weak hypothesis h(i)=0.

In addition, h(z) indicates a function that becomes 0 when z>0, and 1 when z≤0.

Subsequently, the identification unit 234 multiplies the calculated weak hypothesis h(i) and a value α(i) that is stored in the score (α) 504 to calculate h(i)α(i). The identification unit 234 repeats the calculation process from $0^{th}$ row to (L−1)-th row of the face identification dictionary storage unit 500, and calculates the sum value of h(i)α(i) as a score S. Specifically, the score S (final hypothesis) is calculated using Formula 4.

$$S = \sum_{i=0}^{L-1} h(i)\alpha(i) \qquad \text{Formula 4}$$

Subsequently, the identification unit 234 determines whether or not the face included in the face image is a registered face based on the score S calculated with Formula 4. Specifically, when the score S is equal to or higher than a threshold value S1, the face included in the face image is determined to be a registered face. On the other hand, when the score S is less than the threshold value S1, the face included in the face image is determined not to be a registered face. Furthermore, the threshold value S1 may use a fixed value, or may change according to the registered face. In other words, the threshold value S1 to be compared to the score S can be appropriately adjusted. In addition, the difference value D(i) may be adjusted using a gain coefficient, or the like.

Next, a detailed calculation process will be described.

Herein, FIGS. 17A to 17C show feature amounts 601, 611, and 621 stored in the registered face feature amount storage unit 400 in the left side and feature amounts 602, 612, and 622 calculated by the feature amount calculation unit 233 in the right side. In addition, FIGS. 17A to 17C show areas corresponding to two feature amounts used in the identification process by the identification unit 234 surrounded with thick-lined rectangles.

First, the value of a score S for determination is set to 0. As shown in FIG. 17A, computation is performed using each value stored in the $0^{th}$ row of the face identification dictionary storage unit 500. Specifically, two feature amounts specified by the feature point identification information 501 and the positional information (x,y) 502 of the $0^{th}$ row of the face identification dictionary storage unit 500 are acquired. Herein, a feature amount acquired from the registered face feature amount storage unit 400 is set to A(0) and a feature amount calculated by the feature amount calculation unit 233 is set to B(0). Then, using the following formula, the difference value D(0) is calculated.

$$D(0)=A(0)-B(0)$$

For example, the difference value D(0) is calculated as shown by a dotted-lined rectangle 603.

Subsequently, the calculated difference value D(0) is compared to a threshold value th(0) of the threshold value (th) 503 stored in the $0^{th}$ row of the face identification dictionary storage unit 500. Then, a weak hypothesis h(0) is calculated based on the comparison result of the threshold value th(0) and the difference value D(0). Furthermore, the weak hypothesis h(0) is calculated using the above-described formula.

Subsequently, by multiplying the calculated weak hypothesis h(0) by a value α(0) of the score (α) 504 stored in the $0^{th}$ row of the face identification dictionary storage unit 500, h(0)α(0) is calculated.

Subsequently, using each value stored in the first row of the face identification dictionary storage unit 500, the each above-described computation is repeated. Specifically, as shown in FIG. 17B, computation is performed using each value stored in the first row of the face identification dictionary storage unit 500 (calculation of a difference value D(1) (a dotted-lined rectangle 613), calculation of a weak hypothesis h(1), calculation of h(1)α(1), and calculation of the score S).

Subsequently, sequentially using each value stored in the second row to (L−1)-th row of the face identification dictionary storage unit 500, each above-described computation is performed. Then, after each computation using each value stored in the (L−1)-th row of the face identification dictionary storage unit 500 is completed, it is determined whether or not the score S is equal to or higher than the threshold value S1.

For example, a case is assumed where a learning sample of a success in registered face identification is set to a positive side and a learning sample of a failure in registered face identification is set to a negative side when learning is performed by the above-described machine learning algorithm. In this case, when the score S is equal to or higher than the threshold value S1 after the completion of each computation using each value stored in the $0^{th}$ row to the (L−1)-th row of the face identification dictionary storage unit 500, the face image is determined to include a registered face. On the other hand, when the score S is less than the threshold value S1 after the completion of each computation, the face image is determined not to include a registered face.

Herein, a case is assumed where an image generated by the imaging unit 112 is displayed on the display unit 170 (so-called display of a through image). In this case, when the face included in the face image is determined to be the registered face as the detection result of the identification process by the identification unit 234, for example, it is possible to display the detection result on the display unit 170 by linking with the registered face. As such a detection result, it is possible to display the registered face on the display unit 170 by giving a frame thereon so as to surround at least a part thereof.

In addition, based on the detection result, the camera parameter control unit 220 can, for example, decide the optimum camera parameters for the registered face. It is possible to set the camera parameters so as, for example, to make the registered face look beautiful. For example, auto-focusing control is performed by setting the position of the registered face in the image to an AF area (distant-measuring area). In addition, auto-control such as white balance, color balance, exposure, or the like is performed so as to have optimum capturing conditions for the registered face.

[Operation Example of Imaging Device]

Next, the operation of the imaging device 100 according to the above-described embodiment will be described with reference to drawings.

FIG. 18 is a flowchart showing an example of a processing procedure of an image recording process by the imaging device 100 according to the first embodiment of the present disclosure.

First, it is determined whether or not the device is in an image recording stand-by state (Step S901). When the device is in the image recording stand-by state (Step S901), the imaging unit 112 generates an image (Step S902), and the registered face detection unit 300 performs a registered face detection process for the generated image (Step FS910). Furthermore, the registered face detection process may be performed for each frame, or may be performed for a frame for a fixed interval. On the other hand, when the device is not in the image recording stand-by state (Step S901), the operation of the image recording process ends.

Subsequently, the camera parameter control unit 220 decides camera parameters (Step S903). When the registered face detection unit 230 outputs registered face detection information, for example, the camera parameter control unit 220 decides the optimum camera parameters for the detected registered face based on the position and the size of the detected registered face in the image. Then, it is determined whether or not the shutter button is pressed down (Step S904), and when the shutter button is pressed down, the recording unit 150 records the generated image as a still image (Step S905). On the other hand, when the shutter button is not pressed down (Step S904), the operation of the image recording process ends.

Figure 19:
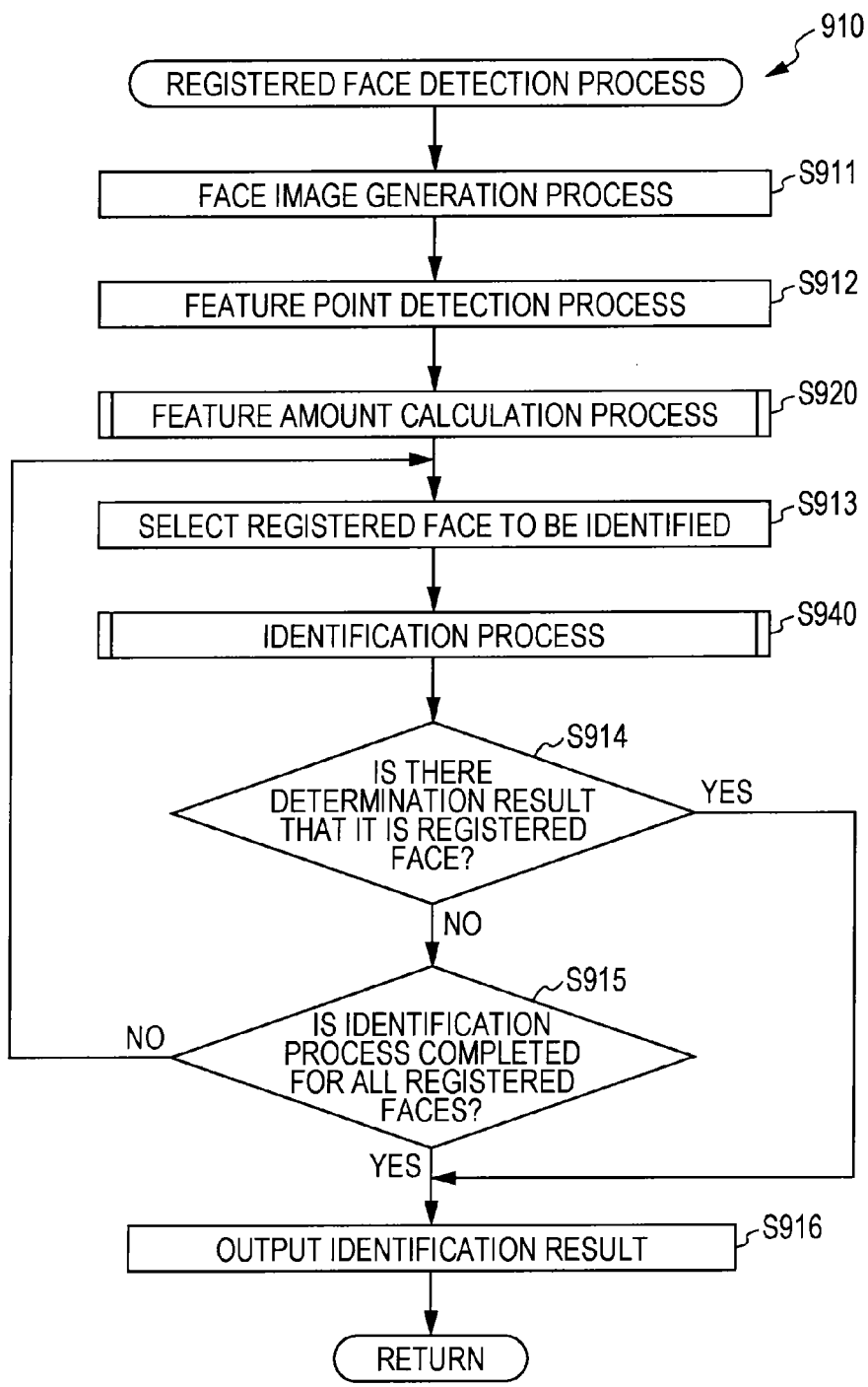
FIG. 19 is a flowchart showing a registered face detection processing procedure in the processing procedure of the image recording process by the imaging device according to the first embodiment of the present disclosure.

FIG. 19 is a flowchart showing a registered face detection processing procedure (the processing procedure of Step S910 shown in FIG. 18) in the processing procedure of the image recording process by the imaging device 100 according to the first embodiment of the present disclosure.

First, the face image generation unit 300 generates an image (face image) including the face of the person for the image output from the image acquisition unit 231 (Step S911). Subsequently, the feature point detection unit 232 detects feature points of the face included in the face image generated by the face image generation unit 300 using the feature point detection dictionary stored in the feature point detection dictionary storage unit 250 (Step S912).

Subsequently, the feature amount calculation unit 233 performs a feature amount calculation process for calculating the feature amounts of each feature point in the face image generated by the face image generation unit 300 (Step S920). The feature amount calculation process will be described in detail with reference to FIG. 20.

Subsequently, the identification unit 234 selects one registered face to be identified among registered faces of which the feature amounts are stored in the registered face feature amount storage unit 400 (Step S913). Then, using the feature amounts stored in relation to the selected registered face (the registered face to be identified), an identification process is performed for identifying whether or not the face included in the face image generated by the face image generation unit 300 is the registered face (Step S940). The identification process will be described in detail with reference to FIG. 21.

Subsequently, in the identification process (Step S940), it is determined whether or not the determination that the face is the registered face is made (Step S914). Then, when the determination that the face is the registered face is made, the identification result output unit 235 outputs the determination result (identification result) to the sequence control unit 210 (Step S916).

In addition, when the determination that the face is the registered face is not made (Step S914), it is determined whether or not the identification process is completed for all registered faces among the registered faces of which the feature amounts are stored in the registered face feature amount storage unit 400 (Step S915). Then, when the identification process is completed for all registered faces (Step S915), the identification result output unit 235 outputs the determination result (identification result) to the sequence control unit 210 (Step S916). On the other hand, when the identification process is not completed for all registered faces (Step S915), the process returns to Step S913, and one registered face to be identified is selected among the registered faces of which the feature amounts are stored in the registered face feature amount storage unit 400.

Figure 20:
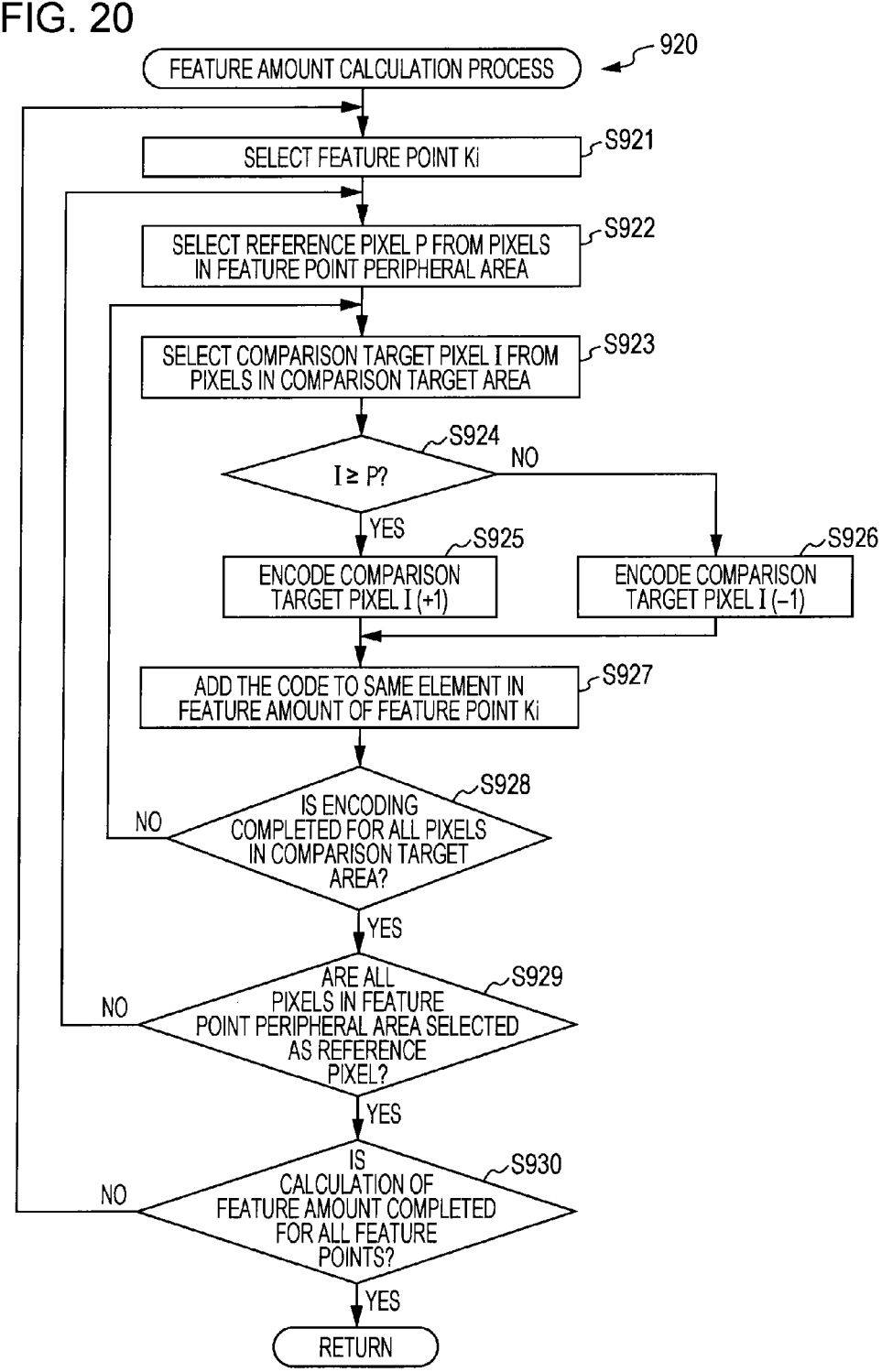
FIG. 20 is a flowchart showing a feature amount calculation processing procedure in the registered face detection processing procedure by the imaging device according to the first embodiment of the present disclosure.

FIG. 20 is a flowchart showing a feature amount calculation processing procedure (the processing procedure of Step S920 shown in FIG. 19) in the registered face detection processing procedure by the imaging device 100 according to the first embodiment of the present disclosure.

First, a feature point k(i) (wherein, $0 \leq i \leq K-1$) is selected (Step S921). Next, a reference pixel P is selected from pixels within a feature point peripheral area set for the feature point k(i) (Step S922). Then, a comparison target pixel I is selected from pixels within a comparison target area set for the reference pixel P (Step S923).

Subsequently, it is determined whether or not a luminance component of the comparison target pixel I is equal to or greater than a luminance component of the reference pixel P (Step S924). When the luminance component of the comparison target pixel I is equal to or greater than the luminance component of the reference pixel P (Step S924), the comparison target pixel I is encoded to "+1" (Step S925). On the other hand, when the luminance component of the comparison target pixel I is less than the luminance component of the reference pixel P (Step S924), the comparison target pixel I is encoded to "−1" (Step S926). Steps S924 to S926 are an example of the conversion procedure described in the claims.

Subsequently, the value ("+1" or "−1") encoded for the comparison target pixel I is added to the values of the same elements within the pixel point peripheral area set for the feature point k(i) (Step S927). Step S927 is an example of the calculation process described in the claims.

Subsequently, it is determined whether or not encoding is completed for all pixels within the comparison target area set for the reference pixel P (Step S928), and when encoding has not been completed for all the pixels, the process returns to Step S923, and a new comparison target pixel I is selected. On the other hand, when encoding has been completed for all the pixels (Step S928), it is determined whether or not all the pixels within the feature point peripheral area set for the feature point k(i) are selected as the reference pixel P (Step S929).

When all the pixels within the feature point peripheral area set for the feature point k(i) are not selected as the reference pixel P (Step S929), the process returns to Step S922, and a new reference pixel P is selected. When all the pixels are selected as the reference pixel P (Step S929), it is determined whether or not calculation of feature amount is completed for all feature points (Step S930). When the calculation of feature amount has not been completed for all feature points (Step S930), the process returns to Step S921, and a new feature point k(i) (wherein, $0 \leq i \leq K-1$) is selected. When the calculation of feature amount has been completed for all feature points (Step S930), the operation of the feature amount calculation process ends.

Figure 21:
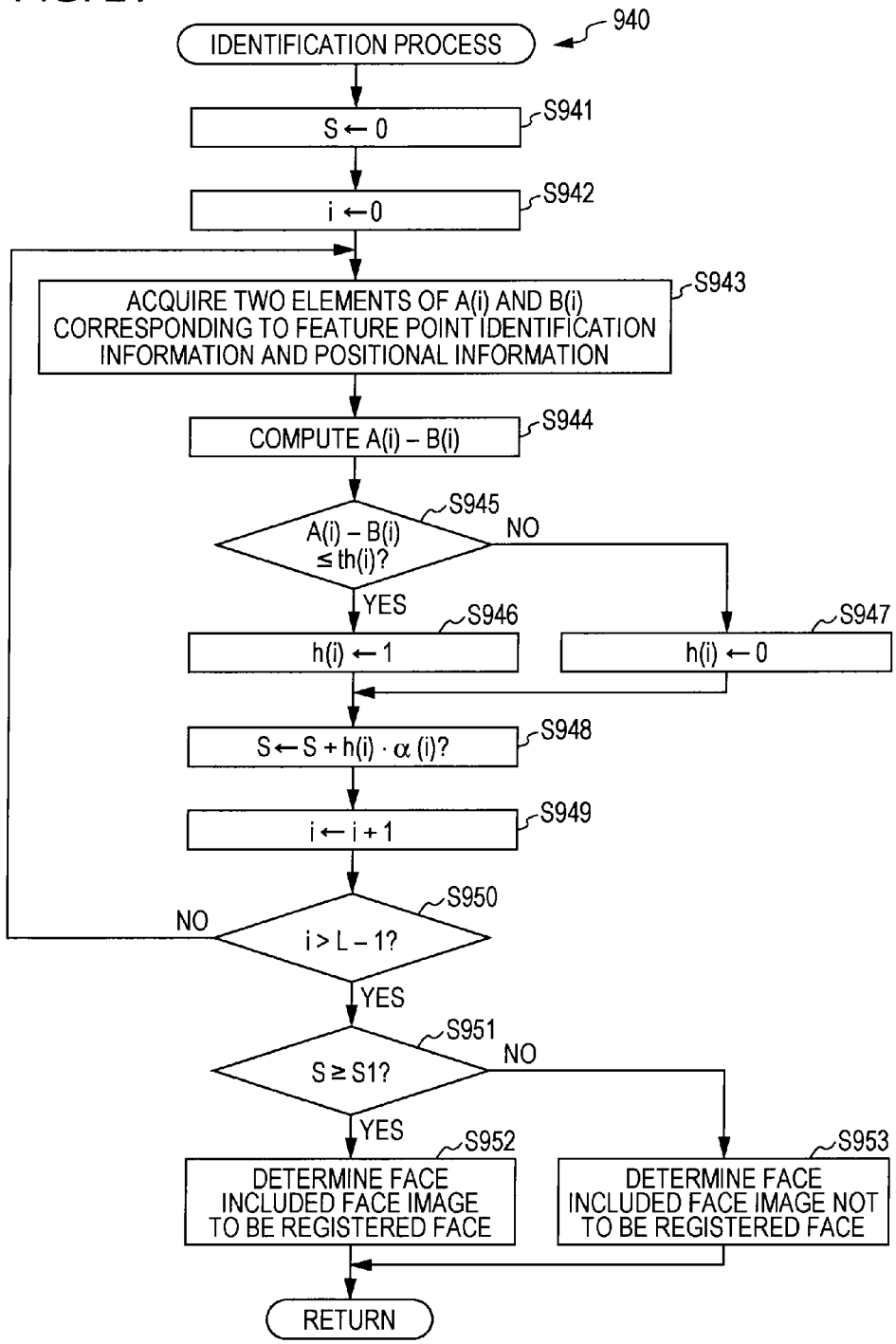
FIG. 21 is a flowchart showing an identification processing procedure in the registered face detection processing procedure by the imaging device according to the first embodiment of the present disclosure.

FIG. 21 is a flowchart showing an identification processing procedure (the processing procedure of Step S940 shown in FIG. 19) in the registered face detection processing procedure by the imaging device 100 according to the first embodiment of the present disclosure.

First, the score S is initialized to "0" (Step S941), and a variable i is initialized to "1" (Step S942). Next, values of the elements A(i) and B(i) specified by the feature point identification information 501 and the positional information (x,y) 502 stored in i-th row of the face identification dictionary storage unit 500 are acquired (Step S943). Herein, the element A(i) is acquired from the registered face feature amount storage unit 400, and the element B(i) is acquired from the feature amounts calculated by the feature amount calculation unit 233.

Subsequently, the difference value D(i) of the acquired values of the elements A(i) and B(i) is calculated (Step S944). Next, the threshold value th(i) of the threshold value (th) 503 stored in the i-th row of the face identification dictionary storage unit 500 and the calculated difference value D(i) are compared (Step S945). Then, when the calculated difference value D(i) is equal to or lower than the threshold value th(i) (Step S945), a weak hypothesis h(i) is calculated to be 1 (Step S946). On the other hand, when the calculated difference value D(i) is greater than the threshold value th(i) (Step S945), the weak hypothesis h(i) is calculated to be 0 (Step S947).

Subsequently, after multiplying a value $\alpha(i)$ of the score ($\alpha$) 504 stored in the i-th row of the face identification dictionary storage unit 500 by the calculated weak hypothesis h(i), a value $h(i)\alpha(i)$ obtained from the multiplication is added to the score S (Step S948).

Subsequently, "1" is added to the variable i (Step S949), and it is determined whether or not the variable i is greater than (L−1) (Step S950). When the variable i is not greater than (L−1) (Step S950), the determination process for values of each row of the face identification dictionary storage unit 500 has not been completed, and thus, the process returns to Step S943, and the determination process is repeated (Steps S943 to S949). On the other hand, when the variable i is greater than (L−1) (Step S950), the determination process for values of each row of the face identification dictionary storage unit 500 has been completed, and thus, the process advances to Step S951, and it is determined whether or not the value of the score S is equal to or higher than the threshold value S1 (Step S951).

When the value of the score S is equal to or higher than the threshold value S1 (Step S951), it is determined that the face included in the face image is the registered face (Step S952). On the other hand, when the value of the score S is less than the threshold value S1 (Step S951), it is determined that the face included in the face image is not the registered face (Step S953).

In addition, in this example, the example is described in which the determination process is performed after the score S is calculated using each value from $0^{th}$ row to (L−1)-th row of the face identification dictionary storage unit 500. However, the determination process may be cut off when a cutoff threshold value is stored corresponding to each record of the face identification dictionary storage unit 500, and the score S obtained in Step S948 is lower than the cutoff threshold value of the current record. Accordingly, it is possible to further speed up the identification process.

Hereinabove, the example is shown in which the feature amount calculation unit 233 calculates the feature amounts (GHF) including all elements for all the feature points detected by the feature point detection unit 232. However, only the elements of the feature amounts used in the identification process by the identification unit 234 may be calculated. Specifically, the feature amount calculation unit 233 may calculate on elements specified by the feature point identification information 501 and the positional information (x,y) 502 of the face identification dictionary storage unit 500. In other words, the feature amount calculation unit 233 performs conversion only for the positions relating to the feature amounts used in the identification process among the positions of pixels included in the second area, and performs computation of feature amounts only for the positions relating to the feature amounts used in the identification process among the positions of pixels included in the second area.

For example, a case is assumed where the feature point peripheral area (m×n area) is set to 3 pixels×3 pixels (m×n=3×3), and the comparison target area (M×N area) is set to 5 pixels×5 pixels (M×N=5×5), and the number of feature points is set to 70 (K=70). When feature amounts (GHF) including all elements are to be calculated, it is necessary to perform computation of the elements of (3×3)×(5×5−1)×70=15120. On the other hand, when only an element specified by the feature point identification information 501 and the positional information (x,y) 502 of the face identification dictionary storage unit 500 is to be calculated, computation for only L (for example, about 1000) elements is performed. In other words, in comparison to the case where the feature amounts (GHF) including all the elements are calculated, only about $\frac{1}{15}$ of the amount may be computed. For this reason, it is possible to simultaneously reduce the computation amount and memory use amount relating to the calculation of the feature amounts.

[Comparison Example of Gabor Filter and LBP (Local Binary Pattern)]

As a feature amount used in the identification process for identifying the same person, the "Gabor Filter" and "LBP" will be briefly described for comparison.

For example, a case is assumed where the Gabor filter is used as a feature amount used in the process of identifying the face of a person. The Gabor filter is a spatial filter having selectivity on a specific frequency f and a specific angle θ. In addition, a plurality of filters is constituted by combinations in which the frequency f and the angle θ change in stages, and a pair of the obtained scalar responses is called a "Gabor jet". A filter window to which the Gabor filter is applied uses a fixed size of 24 pixels×24 pixels, or the like, and the frequency f and the angle θ are selected with which an effective scalar response is obtained within the fixed filter window. For example, it is possible to obtain Gabor jets and set as feature amounts using the frequency f of 5 patterns and the angle θ of 8 patterns, and applying the Gabor filter of all 40 patterns to all pixels of a normalized face image with 45 pixels×36 pixels.

In this case, the feature amounts (Gabor jets) of an input face image and a registered face image are calculated when a dictionary for performing identification of a person's face is to be created. A Gabor filter response advantageous for determination of the same person's face is selected from the similarity of the feature amounts of pixels corresponding to the face image by statistical learning (AdaBoost), and then such a dictionary is created.

In addition, during the identification process, referring to a statistical dictionary that has been learned, Gabor filter responses of a specific pixel, frequency f, and angle θ are calculated, and a similarity score of the face of the same person is calculated from the difference value of the responses. When the calculation of the Gabor filter is performed, for example, if the Gabor filter responses are calculated directly from the formula, the computation becomes late due to inclusion of a trigonometric function, or the like.

For this reason, a method of obtaining the filter responses is generally used such that a filter coefficient set for calculating the Gabor filter responses is prepared for the frequency f and the angle θ of patterns that are determined in advance, and the coefficient set is multiplied by the face image. In this case, since it is necessary to make the filter coefficient set into a table, the memory consumption amount increases.

In addition, since the computation of the Gabor filter gets faster, if the size of the filter window is reduced, it is difficult for the texture itself in the filter window to express the frequency f of all patterns, and effective filter responses are not obtained. For this reason, the size of the filter window with about 24 pixels×24 pixels is generally used, and a filter window with a small size of 9 pixels×9 pixels for speed-up of computation is not generally used.

Next, a case is assumed where the LBP is used as a feature amount used in the process of identifying a person's face. LBP is a feature amount obtained such that rotation information of local texture is replaced by a code pattern of "0" or "1", and an appearance frequency of code information in a target image area is turned into a histogram.

In a calculation method of LBP, for example, a target pixel is put in the center, and comparison is performed for the center pixel and pixels on the exterior frame around the center. Based on the comparison result, if the pixels on the exterior frame have luminance equal to or higher than that of the center pixel, encoding is performed to "1", if the luminance is less than that of the center pixel, encoding is performed to "0", and values of the code patterns of "0" and "1" obtained as the result are labeled. Then, LBP is applied to all pixels in the target image area, and the number of times that the same label appears is made into a histogram, which eventually serves as the feature amount of LBP.

Furthermore, in LBP, a label in which a code change of "0 to 1" or "1 to 0" appears at the frequency of two or less times is called a uniform pattern. The uniform pattern is counted as a single label, and labels other than the uniform pattern are arranged and counted as one label.

As such, when LBP is used as the feature amount, a code pattern of "0" or "1" is obtained and then a label appearance frequency is counted, and therefore, it is necessary to search for a label corresponding to a detected code pattern, and the search process takes time.

In addition, when noise is included in an image itself, and noise is placed on the center pixel during the creation of a code pattern, there is a possibility of generating another code pattern, and it is considered that LBP is a feature amount that is easily affected by noise.

On the other hand, in the first embodiment of the present disclosure, GHF is used as a feature amount used when the identification process is performed. In GHF, since computations performed for calculating a feature amount are only a comparison of luminance and addition, it is possible to rapidly obtain the feature amount. In other words, it is possible to more rapidly obtain the feature amount than the Gabor filter and LBP do.

For example, when the Gabor filter is used, the size of a filter window with about 24 pixels×24 pixels is necessary for an input face image with 45 pixels×36 pixels. On the other hand, in the feature amount (GHF), it is possible to efficiently express the characteristics of an input face image with 80 pixels×80 pixels with a filter window of 15 pixels×15 pixels, which enables a rapid computation.

In addition, during the execution of the identification process using the feature amount (GHF), it is possible to calculate the score S used in the determination process using only the feature amounts of the feature amount elements as many as the amount of weak hypotheses using AdaBoost as well, which enables a rapid computation.

In addition, when a dictionary to be used in the identification process by the feature amount (GHF) is created, since the computation of the feature amount (GHF) itself is performed rapidly, it is possible to reduce the creation time for the dictionary.

In addition, the computation of the feature amount (GHF) includes only a comparison computation of a reference pixel and pixels therearound, encoding, and addition of the same elements. For this reason, it is not necessary to prepare table data (in other words, table data that asks for advance preparation) such as a filter table used in the Gabor filter, a table of labels used in LBP, or the like, which realizes memory save.

In addition, since the feature amount (GHF) itself is a feature amount that the positional error is taken into consideration, the feature amount (GHF) is a feature amount that has little feature point position errors in detection of the face portion. For this reason, it is possible to perform the identification process with high accuracy even in cases where noise is included in an input image and errors easily occur in the detection of feature points.

In addition, when an algorithm used in the detection of the face portion is changed, it is possible to easily absorb assumed detection errors by changing the size or the form of a feature point peripheral area and a comparison target area thereof.

In addition, since luminance information is encoded (−1 or +1) through comparison to a reference pixel when the feature amount (GHF) is calculated, the feature amount (GHF) is a feature amount that is not easily influenced by the magnitude of a luminance change. For this reason, even when a change occurs in illumination, a robust identification process is possible.

2. Second Embodiment

In the first embodiment of the present disclosure, an example is described which uses areas with fixed sizes as the feature point peripheral area and the comparison target area (for example, the feature point peripheral area (m pixels×n pixels) and the comparison target area (M pixels×N pixels)). Herein, for example, in most cases, characteristic ranges are different for each portion corresponding to feature points on the face of a person. For this reason, it is considered to change the sizes of the feature point peripheral area and the comparison target area for each feature point. Therefore, in a second embodiment of the present disclosure, an example will be described in which the sizes of the feature point peripheral area and the comparison target area are changed for each feature point. Furthermore, the configuration of the imaging device according to the second embodiment of the present disclosure is substantially the same as that according to the first embodiment of the present disclosure. For this reason, the same reference numerals will be given to the portions common to those of the first embodiment according to the present disclosure, and part of description thereof will be omitted.

[Example of Setting Feature Point Peripheral Area (m×n Area)]

FIGS. 22A to 23C are diagrams showing an example of setting a feature point peripheral area used when feature amounts are calculated by the feature amount calculation unit 233 according to the second embodiment of the present disclosure.

Figure 22A:
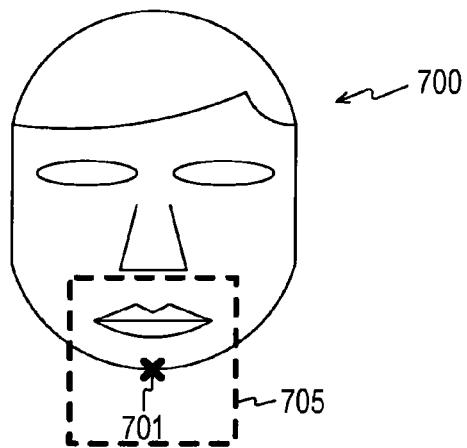
FIGS. 22A to 22C are diagrams showing an example of setting a feature point peripheral area used when feature amounts are calculated by the feature amount calculation unit according to a second embodiment of the present disclosure.
Figure 22B:
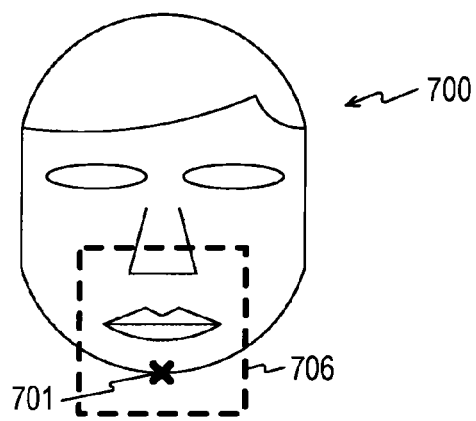
Figure 22C:
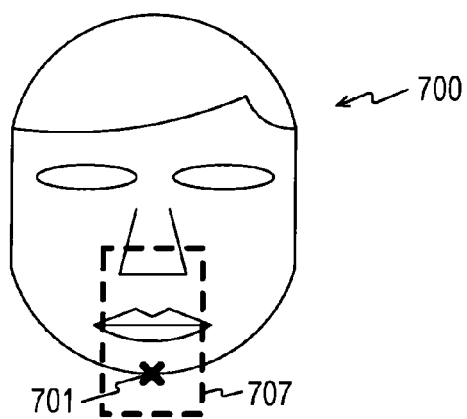

FIGS. 22A to 22C show an example of setting the feature point peripheral area when the edge of the chin on a person's face 700 is set to a feature point 701.

FIG. 22A shows a feature point peripheral area 705 (in a fixed size) that is shown in the first embodiment of the present disclosure. In other words, the feature point peripheral area 705 is a fixed-sized area (for example, 5 pixels×5 pixels) having the feature point 701 that is the edge of the chin on the person's face 700 as the center position.

FIG. 22B show a feature point peripheral area 706 obtained when the feature point peripheral area 705 shown in FIG. 22A is moved in the upper side of the longitudinal direction of the person's face 700. In other words, the feature point peripheral area 706 is an area with a fixed size (for example, 5 pixels×5 pixels) having the center position in the further upper side (upper side of the longitudinal direction of the person's face 700) than the position of the feature point 701 of the edge of the chin on the person's face 700. As shown in FIG. 22B, it is possible to obtain feature amount including more texture information on the face if the center position of the feature point peripheral area 706 is moved further upward than the position of the feature point 701 of the edge of the chin.

Herein, the size of the feature point peripheral area (m×n area) is in proportional to the calculation time of the feature amounts. For this reason, by reducing the feature point peripheral area (m×n area), it is possible to speed up the calculation process of the feature amounts. The example is shown in FIG. 22C.

FIG. 22C shows a feature point peripheral area 707 obtained when the size of the feature point peripheral area 706 shown in FIG. 22B is shorted in the lateral direction of the person's face 700. In other words, the feature point peripheral area 707 is an area obtained by changing such that the center position thereof is moved further upward (in the upper side of the longitudinal direction of the person's face 700) than the position of the feature point 701 of the edge of the chin of the person's face 700 to change the size (for example, 5 pixels×3 pixels). As shown in FIG. 22C, it is possible to shorten the size of the feature point peripheral area 707 in the lateral direction, and to omit an area having a little texture information. Accordingly, it is possible to calculate the feature amounts efficiently using necessary texture information in the peripheral area of the feature point 701.

Figure 23A:
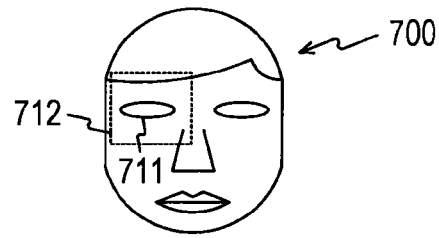
FIGS. 23A to 23C are diagrams showing an example of setting a feature point peripheral area used when feature amounts are calculated by the feature amount calculation unit according to the second embodiment of the present disclosure.
Figure 23B:
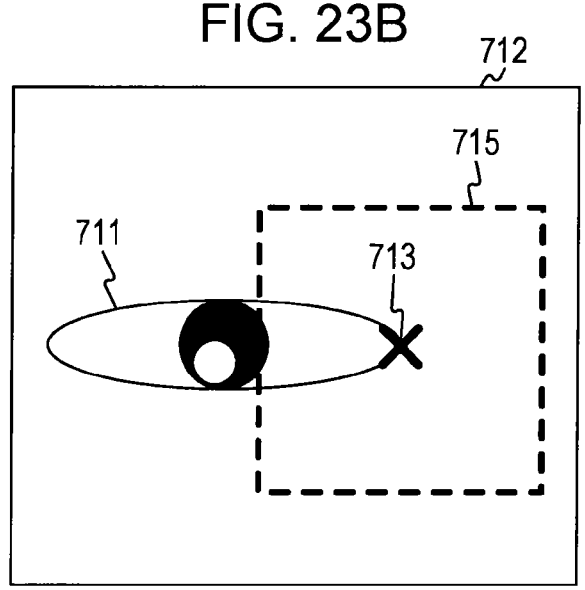
Figure 23C:
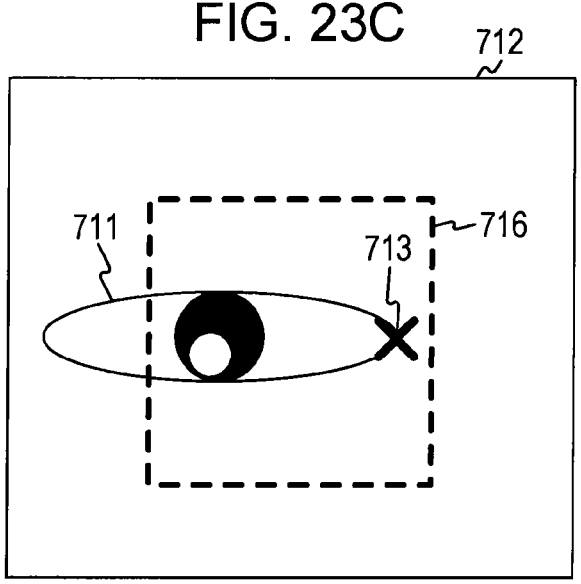

FIGS. 23A to 23C are diagrams showing an example of setting a feature point peripheral area used when the inner corner of the right eye 711 in a person's face 710 is set to a feature point 713.

FIG. 23A shows a person's face 710. FIGS. 23B and 23C show an enlarged area 712 that includes the right eye 711 on the person's face 710 shown in FIG. 23A.

FIG. 23B shows a feature point peripheral area 715 (in a fixed size) shown in the first embodiment of the present disclosure. In other words, the feature point peripheral area 715 is an area having a fixed size (for example, 5 pixels×5 pixels) with a feature point 713 in the inner corner of the right eye 711 on the person's face 710 as the center position.

FIG. 23C shows a feature point peripheral area 716 obtained when the feature point peripheral area 715 shown in FIG. 23B is moved to the right side in the lateral direction of the person's face 710. In other words, the feature point peripheral area 716 is an area in a fixed size (for example, 5 pixels×5 pixels) having the center position in the further right side than the position of the feature point 713 (right side in the lateral direction of the person's face 710) in the inner corner of the right eye 711 on the person's face 710. As shown in FIG. 23C, it is possible to effectively acquire the characteristic of the periphery of the eye tail if the center position of the feature point peripheral area 716 is moved further to the right than the position of the feature point 713 in the inner corner of the right eye 711.

[Example of Setting Comparison Target Area (M×N Area)]

FIGS. 24A to 25D are diagrams showing an example of setting a comparison target area used when feature amounts are calculated by the feature amount calculation unit 233 according to the second embodiment of the present disclosure.

As described above, an area which encompasses detection errors of feature points in each portion on a face is set as a comparison target area. When feature point detection is performed with a face part detection accuracy including an error of one pixel, M×N can be set to, for example, 3×3, and when feature point detection is performed with a face part detection accuracy including an error of two pixels, M×N can be set to 5×5. Furthermore, when a position error in the feature point detection has statistical anisotropy, the statistical anisotropy may be shown to a direction in which such a position error easily occurs (for example, M×N=3×5. As a case where a position error in feature point detection has anisotropy (for example, in the case of a person's face), an example of the edge of the chin (shown in FIGS. 24A and 24B) and an example of contour of the right side of an eye (shown in FIGS. 25A to 25D) are shown. In addition, when detection errors are encompassed, it is not necessary to shape the area into a rectangle, but an arbitrary shape that is made based on feature points is possible.

Figure 24A:
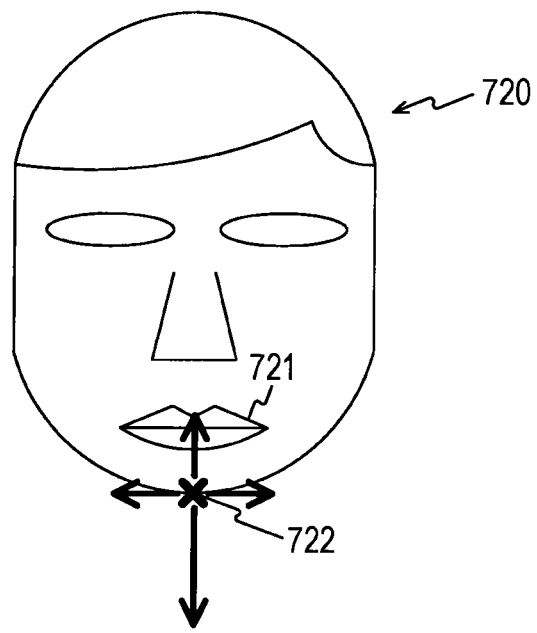
FIGS. 24A to 24B are diagrams showing an example of setting a comparison target area used when feature amounts are calculated by the feature amount calculation unit according to the second embodiment of the present disclosure.
Figure 24B:
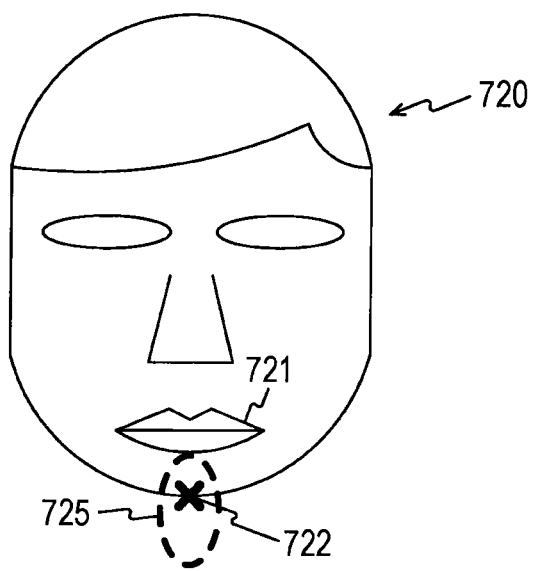

FIGS. 24A to 24B show an example of setting a comparison target area when the edge of the chin of the person's face 720 is set as a feature point 722. FIG. 24A shows the person's face 720 (having the edge of the chin as the feature point 722). FIG. 24B shows an example of setting a comparison target area corresponding to the feature point 722 shown in FIG. 24A.

As shown in FIG. 24A, the feature point 722 of the edge of the chin moves upward and downward in accordance with the movements of the mouth 721, but a lateral movement seldom occurs. For this reason, a feature point detection error becomes an oval shape that is long in the longitudinal direction (for example, an oval shape specified by the four arrows extending from the feature point 722). Thus, it is possible to set a comparison target area so as to cover the area of the oval shape (oval shape elongated in the longitudinal direction) corresponding to the feature point detection error. An example thereof (comparison target area 725) is shown in FIG. 24B.

Figure 25A:
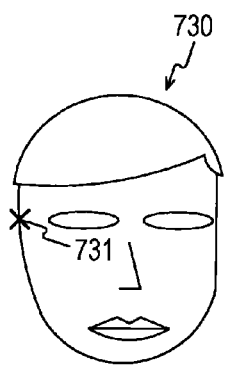
FIGS. 25A to 25D are diagrams showing an example of setting a comparison target area used when feature amounts are calculated by the feature amount calculation unit according to the second embodiment of the present disclosure.
Figure 25B:
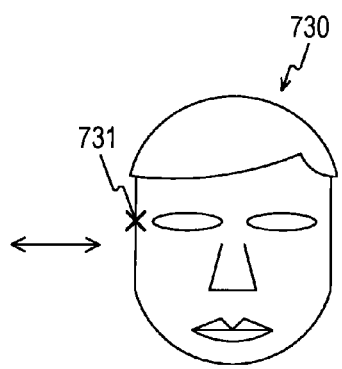
Figure 25C:
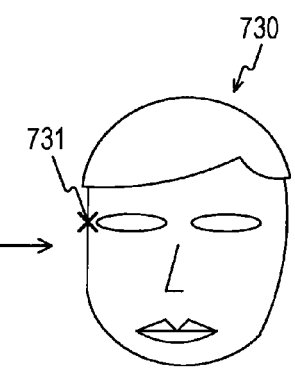
Figure 25D:
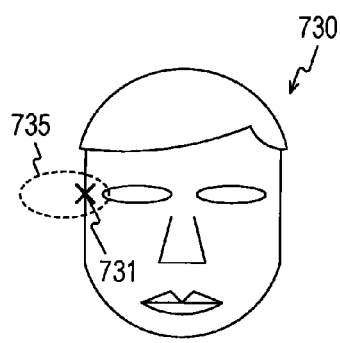

FIGS. 25A to 25D show an example of setting a comparison target area when a contour point to the right side of an eye on a person's face 730 is set to a feature point 731. FIGS. 25A to 25C show a transition example of the postures of the person's face 730 (in which the contour point to the right side of the eye is set to the feature point 731). FIG. 25A shows the person's face 730 facing the front, FIG. 25B shows the person's face 730 when it faces slightly to the left side in the lateral direction, and FIG. 25C shows the person's face 730 when it faces slightly to the right side in the lateral direction. FIG. 25D shows an example of setting a comparison target area corresponding to the feature point 731 shown in FIGS. 25A to 25C.

A case is assumed where the same person is to be identified, for example, when the person's face 730 faces slightly to the left or the right direction as shown in FIG. 25B or 25C. In this case, the contour point (feature point 731) of the person's face 730 statistically has detection distribution that is wide in the lateral direction, as shown in FIGS. 25A to 25C. For this reason, a detection error in feature point detection has anisotropy that is wide in the lateral direction.

As such, it is possible to set a comparison target area based on the range of detection errors even when a feature point detection error has anisotropy by the posture of a face. In other words when feature amounts 731 are to be obtained in the case where the contour point to the right side of an eye on the person's face 730, it is possible to set a comparison target area 735 so as to cover the range of detection errors that is elongated in the lateral direction, as shown in FIG. 25D. An example thereof (comparison target area 735) is shown in FIG. 25D.

As shown in FIGS. 24A to 25D, as the comparison target area 725 in the case where the edge of the chin on the person's face 720 is set to the feature point 722, it is possible to set an area in a shape other than a rectangle (for example, an area in an oval shape). In addition, as the comparison target area 735 in the case where the contour point to the right side of the eye on the person's face 730 is set to the feature point 731, it is possible to set an area in a shape other than a rectangle (for example, an area in an oval shape). In other words, the feature amount calculation unit 233 can perform conversion (encoding) by changing at least one of the size and the shape of the feature point peripheral area relating to a plurality of feature points in a specific target in accordance with the feature points. In addition, the feature amount calculation unit 233 can perform conversion (encoding) by changing at least one of the size and the shape of the comparison target area relating to a plurality of feature points in a specific target in accordance with the feature points. By setting each area as above, it is possible to speed up the calculation process of the feature amounts and to obtain the feature amounts that are free from detection errors.

Furthermore, in the embodiments of the present disclosure, an example is shown in which feature amounts are calculated to perform the identification process using luminance (Y) of each pixel constituting an image, but feature amounts may be calculated using other characteristics of each pixel. For example, as other characteristics of each pixel, elements of RGB, YCbCr, HSV (Hue Saturation Value), a color difference, and the like (for example, elements of color format of an image of which feature amounts are calculated) can be used without change. In addition, for example, only one element out of each element (for example one R out of RGB) may be used.

In addition, in the embodiments of the present disclosure, a case of identifying whether or not the face of a person is the face of a specific person is described, but it is possible to apply the embodiments of the present disclosure to a case of identifying other target. The embodiments of the present disclosure can be applied to cases where entity identification is performed for various targets including, for example, a pet such as a cat, a dog, or the like, an animal, a house, a vehicle (a car or a bike), and the like. When a pet is subject to entity identification, for example, it is easier to identify the pet than to perform individual identification for human beings due to differences of colors, patterns, the shape of ears, and the like.

In addition, the embodiments of the present disclosure can be applied to digital video cameras (for example, a camera-integrated recorder) that image still images and moving images, and various information processing devices such as mobile telephones equipped with an imaging function. In addition, the embodiments of the present disclosure can be applied to, for example, information processing devices such as a registered face detection device that identifies the face of a person by being connected to a surveillance camera, or the like.

Furthermore, in the first embodiment of the present disclosure, the example is shown in which the identification process is performed using the difference value in the same element constituting two feature amounts (GHF) as the similarity degree of the two feature amounts (GHF) to be compared. As the difference value is the similarity degree that is simplest and enables speedy computation, it is possible to rapidly perform an identification process. However, it is possible for other similarity degrees to be substituted for the input of a weak hypothesis function. For example, it is also possible for an item equivalent to the similarity degree of a histogram (for example, Histogram intersection, Log-likelihood statistic, or Chi square statistic) to be substituted for the input of weak hypothesis function.

Furthermore, the above-described embodiments show an example for realizing the present disclosure, and matters in the embodiments and disclosure specific matters in the claims have a corresponding relationship. In the same manner, the disclosure specific matters in the claims and matter in the embodiment of the present disclosure given with the same title as those of the disclosure specific matters have a corresponding relationship, respectively. However, the present disclosure is not limited to the embodiments, but can be realized by performing various modifications to the embodiments in the scope not departing from the gist of the present disclosure. In addition, the processing procedures described in the above-described embodiments may be understood as a method having a series of the procedures. In addition, they may be understood as a program that causes a computer to execute the series of the procedures, or a recording medium that stores the program. As such a recording medium, for example, a CD (Compact Disc), an MD (MiniDisc), a DVD (Digital Versatile Disk), a memory card, a Blu-ray Disc (registered trademark), or the like may be used.

Furthermore, the present disclosure can also have the following configuration.

(1) An information processing device which includes a conversion unit that performs conversion such that an area including a feature point and the periphery thereof in a specific target included in an image is set as a first area and, when one pixel included in the first area is set as a reference pixel, an area including the reference pixel and pixels in the periphery thereof is set as a second area, and, based on a comparison result of the feature amount of the reference pixel and the feature amount of another pixel included in the second area relating to the reference pixel, the feature amount of another pixel is converted for each pixel included in the second area, and a calculation unit that calculates a feature amount to be used in an identification process for identifying the specific target by performing computation for the value of each pixel included in the second area which is obtained from the conversion for each reference pixel for the position of each pixel included in the second area.

(2) The information processing device described in (1) above, in which the calculation unit calculates, as a feature amount to be used in the identification process, a feature amount having the computation result for each position of each pixel included in the second area as a constituent element.

(3) The information processing device described in (2) above, which further includes an identification unit that performs the identification process by comparing a corresponding feature amount acquired from a storage unit that stores the feature amount to be used in the identification process in relation to the specific target to the calculated feature amount for each constituent element.

(4) The information processing device described in (3) above, in which the conversion unit performs the conversion for a plurality of feature points in the specific target, the calculation unit calculates the feature amounts to be used in the identification process for the plurality of feature points, and the identification unit performs the identification process by comparing the feature amount acquired from the storage unit to the calculated feature amount for each of the feature points.

(5) The information processing device described in any one of (1) to (4) above, in which, when the feature amount of another pixel included in the second area relating to the reference pixel is great based on the feature amount of the reference pixel, the feature amount is converted to a first value, and when the feature amount of another pixel included in the second area relating to the reference pixel is small based on the feature amount of the reference pixel, the feature amount is converted to a second value.

(6) The information processing device described in (5) above, in which the conversion unit performs the conversion by setting one of the first and the second values to a positive value and the other to a negative value.

(7) The information processing device described in any one of (1) to (6) above, in which the calculation unit calculates the feature amount to be used in the identification process by performing addition as the computation.

(8) The information processing device described in any one of (1) to (7) above, in which the conversion unit performs the conversion by changing at least one of the size and the shape of the first area relating to the plurality of feature points in the specific target in accordance with the feature points.

(9) The information processing device described in any one of (1) to (8) above, in which the conversion unit performs the conversion by changing at least one of the size and the shape of the second area relating to the plurality of feature points in the specific target in accordance with the feature points.

(10) The information processing device described in any one of (1) to (9) above, in which the conversion unit performs the conversion only for a position relating to the feature point to be used in the identification process among the positions of pixels included in the second area, and the identification unit performs the computation only for a position relating to the feature point to be used in the identification process among the positions of pixels included in the second area.

(11) The information processing device described in any one of (1) to (10) above, which further includes a specific target detection unit that detects the specific target included in the image, a feature point detection unit that detects the feature points in the detected specific target, and an identification unit that performs the identification process using a corresponding feature amount acquired from a storage unit that stores the feature amount to be used in the identification process in relation to the specific target and the calculated feature amount.

(12) The information processing device described in any one of (1) to (11) above, in which the specific target is the face of a person, the feature point is at least one edge portion of organs included in the face, and the identification process identifies whether or not the detected face of the person is the face of a specific person.

(13) An information processing method which includes converting such that an area including a feature point and the periphery thereof in a specific target included in an image is set as a first area and, when one pixel included in the first area is set as a reference pixel, an area including the reference pixel and pixels in the periphery thereof is set as a second area, and, based on a comparison result of the feature amount of the reference pixel and the feature amount of another pixel included in the second area relating to the reference pixel, the feature amount of another pixel is converted for each pixel included in the second area, and calculating a feature amount to be used in an identification process for identifying the specific target by performing computation for the value of each pixel included in the second area which is obtained from the conversion for each reference pixel for the position of each pixel included in the second area.

(14) A program which causes a computer to execute converting such that an area including a feature point and the periphery thereof in a specific target included in an image is set as a first area and, when one pixel included in the first area is set as a reference pixel, an area including the reference pixel and pixels in the periphery thereof is set as a second area, and, based on a comparison result of the feature amount of the reference pixel and the feature amount of another pixel included in the second area relating to the reference pixel, the feature amount of another pixel is converted for each pixel included in the second area, and calculating a feature amount to be used in an identification process for identifying the specific target by performing computation for the value of each pixel included in the second area which is obtained from the conversion for each reference pixel for the position of each pixel included in the second area.

The present disclosure contains subject matter related to that disclosed in Japanese Priority Patent Application JP 2011-062736 filed in the Japan Patent Office on Mar. 22, 2011, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing device comprising:
one or more processors operable to:
perform conversion such that an area including a feature point and the periphery thereof in a specific target included in an image is set as a first area and, when one pixel included in the first area is set as a reference pixel, an area including the reference pixel and pixels in the periphery thereof is set as a second area, and, based on a comparison result of the feature amount of the reference pixel and the feature amount of another pixel included in the second area relating to the reference pixel, the feature amount of another pixel is converted for each pixel included in the second area,
wherein each pixel included in the first area is set as the reference pixel, and
wherein a plurality of second areas are set with each second area in the plurality of second areas including the corresponding reference pixel and the corresponding pixels in the periphery thereof for each pixel included in the first area; and
calculate a feature amount to be used in an identification process for identifying the specific target by performing addition of the value of each pixel included in one of the plurality of second areas and the value of each corresponding pixel included in others of the plurality of second areas.

2. The information processing device according to claim 1, wherein the one or more processors are operable to calculate, as the feature amount to be used in the identification process, a feature amount having the addition result for each position of each pixel included in the plurality of second areas as a constituent element.

3. The information processing device according to claim 2, wherein the one or more processors are operable to perform the identification process by comparing a corresponding feature amount acquired from a storage unit that stores the feature amount to be used in the identification process in relation to the specific target to the calculated feature amount for each constituent element.

4. The information processing device according to claim 3, wherein the one or more processors are operable to perform the conversion for a plurality of feature points in the specific target, calculate the feature amounts to be used in the identification process for the plurality of feature points, and
perform the identification process by comparing the feature amount acquired from the storage unit to the calculated feature amount for each of the feature points.

5. The information processing device according to claim 1, wherein, when the feature amount of another pixel included in one of the plurality of second areas relating to the reference pixel is equal to or higher than the feature amount of the reference pixel, the feature amount of the another pixel is converted to a first value, and when the feature amount of another pixel included in the one of the plurality of second areas relating to the reference pixel is smaller than the feature amount of the reference pixel, the feature amount of the another pixel is converted to a second value.

6. The information processing device according to claim 5, wherein the one or more processors are operable to perform the conversion by setting one of the first value and the second value to a positive value and the other to a negative value.

7. The information processing device according to claim 1, wherein the one or more processors are operable to perform the conversion by changing at least one of the size and the shape of the first area relating to a plurality of feature points in the specific target in accordance with the feature points.

8. The information processing device according to claim 1, wherein the one or more processors are operable to perform the conversion by changing at least one of the size and the shape of the plurality of second areas relating to a plurality of feature points in the specific target in accordance with the feature points.

9. The information processing device according to claim 1, wherein the one or more processors are operable to perform the conversion only for a position relating to the feature amount to be used in the identification process among the positions of pixels included in the plurality of second areas, and
perform the addition only for a position relating to the feature amount to be used in the identification process among the positions of pixels included in the plurality of second areas.

10. The information processing device according to claim 1, wherein the one or more processors are operable to:
detect the specific target included in the image;
detect feature points in the detected specific target; and
perform the identification process using a corresponding feature amount acquired from a storage unit that stores the feature amount to be used in the identification process in relation to the specific target and the calculated feature amount.

11. The information processing device according to claim 1,
wherein the specific target is the face of a person, the feature point is at least one edge portion of organs included in the face, and
wherein the identification process identifies whether or not the detected face of the person is the face of a specific person.

12. The information processing device according to claim 1, wherein each pixel included in the first area is set as the reference pixel to convert the feature amount of another pixels in the plurality of second areas corresponding to each reference pixel.

13. An information processing method comprising:
converting such that an area including a feature point and the periphery thereof in a specific target included in an image is set as a first area and, when one pixel included in the first area is set as a reference pixel, an area including the reference pixel and pixels in the periphery thereof is set as a second area, and, based on a comparison result of the feature amount of the reference pixel and the feature amount of another pixel included in the second area relating to the reference pixel, the feature amount of another pixel is converted for each pixel included in the second area,
wherein each pixel included in the first area is set as the reference pixel, and
wherein a plurality of second areas are set with each second area in the plurality of second areas including the corresponding reference pixel and the corresponding pixels in the periphery thereof for each pixel included in the first area; and
calculating a feature amount to be used in an identification process for identifying the specific target by performing addition of the value of each pixel included in one of the plurality of second areas and the value of each corresponding pixel included in others of the plurality of second areas.

14. A non-transitory computer readable storage medium having stored thereon, a set of computer-executable instructions, for causing a computer to perform steps comprising:
converting such that an area including a feature point and the periphery thereof in a specific target included in an image is set as a first area and, when one pixel included in the first area is set as a reference pixel, an area including the reference pixel and pixels in the periphery thereof is set as a second area, and, based on a comparison result of the feature amount of the reference pixel and the feature amount of another pixel included in the second area relating to the reference pixel, the feature amount of another pixel is converted for each pixel included in the second area,
wherein each pixel included in the first area is set as the reference pixel, and
wherein a plurality of second areas are set with each second area in the plurality of second areas including the corresponding reference pixel and the corresponding pixels in the periphery thereof for each pixel included in the first area; and
calculating a feature amount to be used in an identification process for identifying the specific target by performing addition of the value of each pixel included in one of the plurality of second areas and the value of each corresponding pixel included in others of the plurality of second areas.

* * * * *